United States Patent
Davis

(10) Patent No.: US 10,487,959 B2
(45) Date of Patent: Nov. 26, 2019

(54) MANUAL OVERRIDE SYSTEM FOR MAGNETICALLY ACTUATED VALVES

(71) Applicant: Edward P. Davis, Kihei, HI (US)

(72) Inventor: Edward P. Davis, Kihei, HI (US)

(*) Notice: Subject to any disclaimer, the term of this patent is extended or adjusted under 35 U.S.C. 154(b) by 0 days.

(21) Appl. No.: 16/288,280

(22) Filed: Feb. 28, 2019

(65) Prior Publication Data
US 2019/0264830 A1 Aug. 29, 2019

Related U.S. Application Data

(60) Provisional application No. 62/636,665, filed on Feb. 28, 2018.

(51) Int. Cl.
*F16K 31/08* (2006.01)
*F16K 31/06* (2006.01)
(Continued)

(52) U.S. Cl.
CPC ............ *F16K 31/086* (2013.01); *F16K 1/226* (2013.01); *F16K 31/0655* (2013.01);
(Continued)

(58) Field of Classification Search
CPC ...... F16K 27/02; F16K 41/023; F16K 41/026; F16K 31/0668; F16K 31/0655;
(Continued)

(56) References Cited

U.S. PATENT DOCUMENTS 2,042,845 A * 6/1936 Henry .............. F16K 27/02
137/377
2,151,501 A * 3/1939 Corcoran ............ F16K 17/08
137/468
(Continued)

FOREIGN PATENT DOCUMENTS

EP 2808878 3/2014
WO 2017158380 9/2017

OTHER PUBLICATIONS

Author unknown; International Search Report and Written Opinion of PCT/US2019/019952; dated May 8, 2019; 8 pgs.

*Primary Examiner* — Umashankar Venkatesan
(74) *Attorney, Agent, or Firm* — K&L Gates LLP

(57) ABSTRACT

Various devices and techniques related to magnetically-actuated valves are generally described. Magnetically-actuated valves may include mechanisms to completely seal the valve during normal operation. However, mechanical access to the internal actuation mechanism may be temporarily provided in the event of a stuck valve. Access to a mechanical non-magnetically coupled portion of the internal actuation member may be provided for emergency access. The access to the internal actuation member is sealed off under normal operating conditions. A sealed port covers the portion of the internal actuation member during normal magnetically-coupled operation, but can be removed for direct mechanical access to the actuator. Furthermore, a backup seal may be sheltered within this port. The backup seal is typically not exposed to the outside environment or degradation, but prevents leaks during emergency actuation when access to the internal actuation member is temporarily provided.

19 Claims, 34 Drawing Sheets

(51) Int. Cl.
*F16K 1/226* (2006.01)
*F16K 41/02* (2006.01)
*F16K 27/02* (2006.01)

(52) U.S. Cl.
CPC ........ *F16K 31/0668* (2013.01); *F16K 31/088* (2013.01); *F16K 41/023* (2013.01); *F16K 41/026* (2013.01); *F16K 27/02* (2013.01); *F16K 31/06* (2013.01)

(58) Field of Classification Search
CPC .... F16K 31/086; F16K 31/088; F16K 31/082; F16K 31/06
USPC ................................................ 137/472, 469
See application file for complete search history.

(56) References Cited

U.S. PATENT DOCUMENTS

| | | | | |
|---|---|---|---|---|
| 2,209,709 | A | * | 7/1940 | Weatherhead, Jr. .... F16K 27/02 137/625.5 |
| 2,387,364 | A | * | 10/1945 | Terry ..................... G05D 16/10 137/469 |
| 2,813,539 | A | * | 11/1957 | Farris ..................... F16K 17/08 137/469 |
| 3,687,415 | A | | 8/1972 | Turkot |
| 3,877,677 | A | * | 4/1975 | Daghe ..................... F16K 1/221 251/228 |
| 4,284,262 | A | * | 8/1981 | Ruyak .................. F16K 31/088 251/129.03 |
| 4,327,892 | A | * | 5/1982 | Ruyak .................. F16K 31/088 251/129.03 |
| 4,384,703 | A | * | 5/1983 | Ruyak .................. F16K 31/088 137/556.6 |
| 5,372,351 | A | | 12/1994 | Oliver |
| 9,377,121 | B2 | * | 6/2016 | Burgess ................ F16K 31/041 |
| 9,797,521 | B1 | | 10/2017 | Davis |
| 10,151,403 | B2 | | 12/2018 | Davis |
| 2005/0189509 | A1 | | 9/2005 | Peric |
| 2011/0168933 | A1 | | 7/2011 | Shimizu |
| 2012/0112104 | A1 | * | 5/2012 | Kiesbauer ............. F16K 31/086 251/129.01 |

\* cited by examiner

MANUAL OVERRIDE SYSTEM FOR MAGNETICALLY ACTUATED VALVES

CROSS-REFERENCE TO RELATED APPLICATIONS

This application claims the benefit of U.S. Provisional Application No. 62/636,665 filed Feb. 28, 2018, the disclosure of which is incorporated herein by reference in its entirety.

FIELD

This application relates to valve technology and, more specifically, to valve actuator mechanisms.

BACKGROUND

Valves often develop leaks as they age. Leaking valves can be annoying, wasteful, and can cause damage in residential settings, but can be far more problematic in industrial applications. Factory lines may need to be shut down to repack or replace valves, resulting in lost production and unnecessary downtime. Leaks can cause environmental damage and safety issues. Steam leaks can scald and even kill workers. The Environmental Protection Agency (EPA) is concerned about pollution resulting from leaky valve stem seals in factories and oil fields. In extreme cases, such as semiconductor manufacturing, even microscopic leaks can be fatal—breathing tanks and hazmat suits are often required to clean up after leaks are detected in semiconductor foundries.

Most traditional valves have two moving seals: (1) the "seat" where the flow of material through the valve is allowed, controlled, and shut off, and (2) the "stem seal" that keeps the material from leaking out of the hole for the valve handle. Studies have shown that up to 80 percent of the leaks encountered in real world valves are associated with the stem seals because they tend to entrain dirt and grit which can erode the mating surfaces over time.

Traditional valves contain stem seals that often degrade or leak over time. Previous seal-less valves often employed bending or flexing components such as bellows or membranes that can degrade or fatigue and also leak over long periods of use. Additionally, previous generations of magnetically-actuated valves (sometimes referred to herein as magnetic valves) often include internal magnets and/or operated in a linear solenoid type manner making high temperature operation difficult to achieve, and often requiring continuous power to maintain their position. Previous manual override systems for magnetic valves include dynamic seals that may leak even when the valve was being operated magnetically.

Some industries, such as the petrochemical industry would be very reluctant to accept magnetic valve actuators without a provision to be able to break free a stuck valve in an emergency situation. With traditional valves, the device employed to "unstick" valves is referred to as a "cheater handle" and it is essentially a spanner or wrench like device that attaches over the regular handle to increase the torque applied to the valve. Increased torque is usually due to a longer cheater handle or a cheater handle that allows greater leverage relative to the original valve handle. Typically, cheater handles are only used to break free a badly corroded or stuck valve that hasn't been actuated in a long time. Cheater handles are not typically employed in day-to-day operation.

Magnetic valves have a set torque limit that cannot be increased by simple measures such as attaching a longer lever or handle. This is normally a design feature because it may be desirable to limit the closing torque available from the magnetic valve coupling to protect the valve seat from over-tightening, but unfortunately the valve may become stuck after having been left in one position for an extended period of time, or when handling sticky or corrosive substances. There are various methods available to deal with this dilemma such as those described by Davis in U.S. Pat. Nos. 9,797,521 and 10,151,403, but in instances where these magnetic techniques are insufficient, it may be desirable to employ a traditional mechanical cheater handle such as described in Ruyak's U.S. Pat. Nos. 4,284,262 and 4,372,892.

Other manual override mechanisms such as Ruyak's tend to rely on dynamic seals that are exposed to the outside environment and may degrade over time negating the original advantages of the magnetic valve topology.

SUMMARY

Systems and methods are provided for magnet-actuated valves that can employ a mechanical cheater handle when needed, while still sealing the valve against fluid or gaseous leaks and maintaining completely sealed magnetically-actuated actuation under normal operating conditions.

In accordance with various embodiments of the present invention, a valve assembly is generally described. In some examples, the valve assembly may comprise a valve body defining one or more enclosures. In some other examples, the valve assembly may further comprise a stem disposed in an enclosure. In various other examples, the valve assembly may further comprise a movable valve actuator component disposed in an enclosure and operatively coupled to a first end of the stem. In some examples, the valve assembly may further comprise an internal actuation member having a ferromagnetic portion. In other examples, the internal actuator may contain magnets. In various examples, the internal actuation member may be operatively coupled to a second end of the stem. In some other examples, the valve assembly may further comprise an external actuator operatively coupled to an exterior of the valve body. In some examples, the external actuator may comprise a first magnetic pole section adjacent to the valve body. In some other examples, the external actuator may comprise a second magnetic pole section adjacent to the valve body.

In at least some examples, the internal actuation member and the external actuators described herein may be a mechanical mechanism with the external actuator being an external portion of the mechanism (e.g., external to the valve bonnet/valve body) and the internal actuation member being an internal portion of the mechanism (e.g., internal to the valve bonnet/valve body, such as within an enclosure formed by the valve bonnet/valve body).

In some embodiments, a continuous mechanical valve stem may support fairly high torques per unit of cross-sectional area. When employing a magnetic coupling as an actuation mechanism, large magnets may be used to generate high forces (e.g., high torques) during actuation. However, such large magnets may be expensive and/or bulky. Accordingly, in some examples, it may be advantageous to use smaller magnets and to rotate the coupling mechanically in the event of a severely stuck valve.

Various embodiments described herein comprise an emergency dynamic seal enclosed within the valve and operable to support manual override operation of the valve behind a static, removable plug. Examples of static, removable plugs may include a threaded plug, a cover, an integral portion of the hermetic cover, a soldered and/or brazed cover piece, (e.g., a plug soldered in place) etc. Because of this topology, the emergency manual override seal does not impact the reliability or leak-proof aspect of the valve during normal operation. The emergency manual override seal may be used only during an emergency override condition. Furthermore, after emergency manual operation, a cover piece can be installed or reinstalled such that the dynamic seal does not impact performance of the valve going forward. Additionally, due to the enclosed nature of the manual override seal, the expected lifetime and reliability of the manual override seal and the valve actuator far exceeds exposed seals.

Various embodiments described herein differ from what currently exists. Traditional magnetically actuated valves have a finite torque limit on the magnetic coupling that a larger wrench or longer handle cannot overcome. Embodiments allow mechanical override of magnetically actuated valves without relying on an exposed dynamic seal.

Other magnetic valve designs have incorporated seals that are employed for emergency override conditions. However, such seals can degrade over time and cause leaks—even if they are never used or are not frequently used due to the seal being exposed to the outside environment during normal operation (see John Oliver's U.S. Pat. No. 5,372,351 and Robert Ruyak's U.S. Pat. Nos. 4,284,262 and 4,372,892).

Various embodiments described herein overcome these problems by allowing access directly to the mechanical non-magnetically coupled portion of the valve actuator in emergency situations, with minimal leakage, while completely sealing off that access under normal operating conditions. A knock out plug (e.g., a removable plug) may be pressed into place (similar to plugs used in automobile engines to prevent damage resulting from freezing coolant). In other examples, the knock out plug may be generated by scoring the metal of the bonnet around the plug so that, though the plug is an integral piece of the bonnet in such examples, the plug may be removed by force in an emergency to access the mechanical shaft or linkage that is covered by the plug. In some embodiments, a replacement knock-out plug may be installed/re-installed after the valve has been unstuck using the mechanical shaft/linkage covered by the plug. For example, a replacement plug may be pressed into the hole in the bonnet. In other embodiments, there may be threads below the knock-out plug in order to use a traditional threaded plug to reseal the valve after the cheater handle has been used to get the valve unstuck. In still further embodiments, a pipe fitting plug covers the mechanical shaft and seal during normal magnetically-coupled operation, but can be removed for direct mechanical access to the actuator in an emergency (e.g., a stuck valve). Furthermore, a backup seal is sheltered within this port, and hence, although the mechanical shaft normally is not exposed to the outside environment, the backup seal prevents stem leaks during exposure of the mechanical shaft and emergency actuation. Longer mechanical handles and increased torque may be applied to this mechanical linkage to the non-magnetic portion of the actuator.

Additionally, in various examples described herein, magnets may be disposed outside the sealed valve enclosure, without any internal permanent magnets. Such a valve architecture may use an impermanent magnetic material (e.g., a ferromagnetic material) as an internal actuation component. Such a magnetic valve actuation architecture may allow higher temperature operation of the valve without risk of demagnetization of any internal magnetic components due to heat. Additionally, such valves may be welded, soldered, and/or brazed in place to provide hermetic sealing, as any external magnets used to actuate such valves may be decoupled from the valve prior to welding, soldering, and/or brazing.

In various examples, the magnetically-actuated valves and actuators described herein may offer increased actuation performance, reduced size, and reduced cost relative to traditional mechanical and magnetic valve assemblies. Additionally, in various examples, the various valves and/or actuators described herein may offer emergency access for a mechanical linkage or cheater handle, but may preserve the hermetically sealed valve body during ordinary operation.

The valve assembly may further comprise a valve body defining an enclosure, wherein the internal actuator is disposed in the enclosure; and an external actuator coupled to an exterior of the valve body, the external actuator comprising a first magnetic pole section and a second magnetic pole section adjacent to the valve body; wherein, when the first actuator component is aligned with the second actuator component at the first angular displacement, the first magnetic pole section is magnetically coupled to the first actuator component and the second magnetic pole section is magnetically coupled to the free end of the second actuator component, and rotation of the external actuator in the first direction effectuates rotation of the internal actuator in the first direction. The external actuator is not mechanically coupled to either the internal actuator (e.g., the internal actuation member) or the stem.

In various embodiments, the internal actuator comprises a ferromagnetic material, a permanent magnet, or an impermanently magnetic material. In some embodiments, the valve assembly further comprises a valve member effective to open and close a fluid flow path of the valve assembly; and a valve stem operatively coupled to the internal actuator and to the valve member. As used herein, the term "fluid" may comprise both liquid and gaseous media.

Other approaches, such as employing extremely large magnets to achieve higher torques are expensive, large, potentially have safety implications, and/or are limited in the amount of torque that they can handle. Previous rotary magnetic couplings for valve actuators relied on ever larger magnets, more powerful grades of magnets, and/or internal magnets in order to achieve the necessary torque-handling capability for the valve. Various embodiments described herein offer improvements in magnetic couplings for valve actuators.

Systems including one or more powerful high-grade magnets may be cost prohibitive for many applications, and may not offer competitive performance relative to mechanical valves. Additionally, large valve actuators (e.g., actuators including large, powerful magnets) may not fit in legacy applications, and may not be appealing for new designs due to the space they consume. Torque limitations may preclude certain types of valves, or limit the pressures or other conditions that the valves can be used in.

In some circumstances, it may be desirable to over-torque a valve actuator. For example, in various industries, such as the petrochemical industry, valves may often become corroded and/or stuck in a particular position, such that a normal amount of torque may be insufficient to actuate the valve. In some instance it may even be necessary for a gate valve to be able to cut foreign material caught inside the valve like a knife. In some cases, "cheater" handles may be used to over-torque the actuation mechanism of stuck valves.

As described, magnetic valves may sometimes become stuck in the closed position due to the torque limits inherent in their magnetic couplings, which is a potential problem for many magnetically-actuated valves. Accordingly, in some cases a cheater handle may be used to "break" stuck valves so that the valves may be actuated between a closed and open position (or vice versa). The various methods and actuators described herein may offer improvements over previous attempts to overcome stuck magnetic valves using mechanical cheater handles to act on the valve stem through an exposed portion of the actuator or valve stem. Additionally, various internal mechanisms for valve actuation are described herein, such as lead screw valve stems, traveling nut architectures, worm gear/worm architectures, etc.

Various techniques described herein may overcome this problem by allowing temporary access to a mechanical shaft ordinarily completely enclosed within the valve bonnet by a removable plug and/or cover. The mechanical shaft may be separately sealed with a seal that is not exposed to the outside environment during normal valve operation. The mechanical shaft may transmit increased torque to the internal valve mechanism relative to the torque that the magnetic coupling of the magnetically actuated valve is capable of providing. In various examples, an access port may consist of a threaded plug, a knockout port, a compression joint and/or a cover corresponding to a flange on the valve. In various examples, the mechanical shaft and/or access port may be welded, soldered, and/or brazed in place, depending on the design of the valve, the attachment method of other ports, material compatibility, ease of use considerations, valve design, and/or overall pressure handling capability of the valve. The access port may comprise a removable bonnet employed for magnetic actuation of the valve. The removable bonnet may be removed to access the original valve stem. In various examples, the access port may be retrofit to legacy valves, and may be preferable to other port configurations in certain applications.

Asymmetric torque magnetic valve actuators such as those described by Davis in U.S. Pat. No. 10,151,403 may help to prevent magnetic valves from becoming stuck, and can be used to limit the closing torque on the valve to the recommended valve seating torque (in order to provide optimal valve seat life), but may not be sufficient for severely stuck valves, especially those that have not been actuated for a considerable period of time (e.g., weeks, months, years, etc.).

Stuck valves require maintenance—often with the system shut down, which can reduce reliability and availability of the system. In various examples, cheater handle ports employed on magnetic valve actuators, as described herein, may be used to produce high-reliability magnetic valves, and may significantly reduce or eliminate the problem of valves sticking in open and/or closed positions. In various examples, the internal seal may be the legacy design valve packing. Valve packings may be employed on mechanically-actuated valves to seal between the valve stem and bonnet and hence prevent leaks around the valve stem to the outside environment. In various embodiments valve packing may be used to seal around the area of a shaft and/or stem leading to a cheater handle access port to form an enclosed seal. As such, employing magnetically-actuated valves, such as those described herein, may improve performance by preventing leaks and limiting actuation torque under normal operating conditions, yet the plug or secondary bonnet may be removed and a mechanical handle may be reinstalled in order to revert the valve back to a traditional mechanically-actuated valve, if necessary.

In an example embodiment where the internal backup seal is the original gland packing, the magnetic actuation mechanism may be used as a retrofit kit that may be employed on valves that are already installed in a system, and even valves that are currently operating and/or already leaking. Furthermore, by monitoring and controlling the interstitial pressure in the volume enclosed between secondary bonnet and legacy bonnet with a pressure gauge and/or monitoring device (e.g., with a bleed tube or mechanism, such as those employed on block and bleed type valves), the safety of engaging a cheater handle can be greatly improved, and the potential environmental impact of unanticipated leaks may be significantly reduced.

Still other embodiments of the present disclosure will become readily apparent to those skilled in the art from the following detailed description, which describes embodiments illustrating various examples of the invention. As will be realized, the invention is capable of other and different embodiments and its several details are capable of modifications in various respects, all without departing from the spirit and the scope of the present invention. Accordingly, the drawings and detailed description are to be regarded as illustrative in nature and not as restrictive.

DETAILED DESCRIPTION

In the following description, reference is made to the accompanying drawings that illustrate several embodiments of the present disclosure. Still other embodiments of the present disclosure will become readily apparent to those skilled in the art from the following detailed description, which describes embodiments illustrating various examples of the invention. As will be realized, the invention is capable of other and different embodiments and its several details are capable of modifications in various respects, all without departing from the present disclosure. Accordingly, the drawings and detailed description are to be regarded as illustrative in nature and not as restrictive. It is to be understood that drawings are not necessarily drawn to scale.

Various embodiments of the present disclosure provide improved systems and methods for actuating magnetic valves using one or more torque or actuation force-enhancing mechanisms as described herein. These embodiments may provide improved performance and overcome various technical challenges presented when using conventional magnetic valves.

Figure 1:
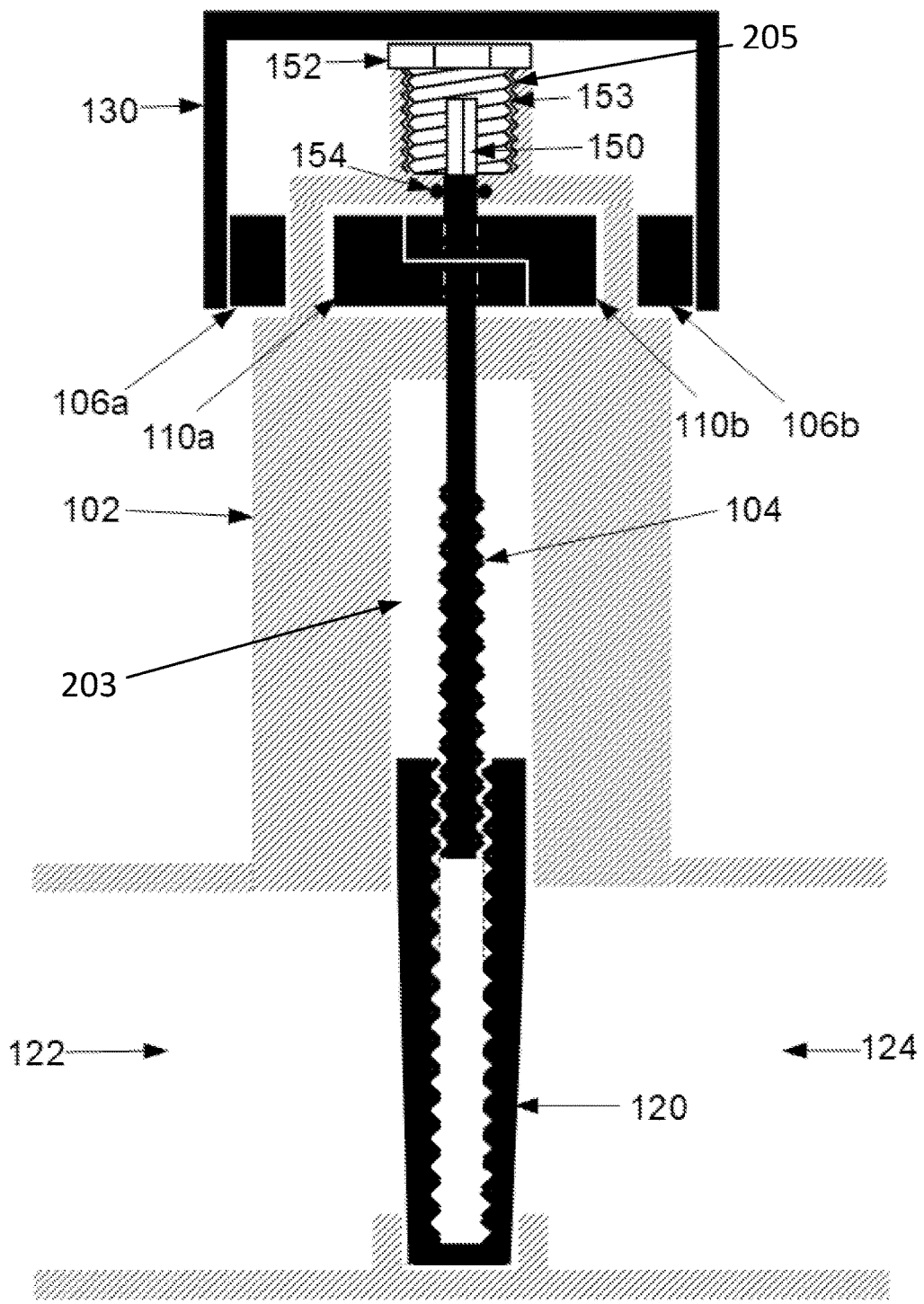
FIG. 1 depicts an assembled side cut-away view of a ferromagnetic magnet-actuated gate valve in the closed position, with the external magnetic actuator in place, including a sealed access port for a cheater handle, in accordance with various aspects of the present disclosure.

FIG. 1 depicts an assembled side cut-away view of a ferromagnetic magnet-actuated gate valve in the closed position, with the external magnetic actuator in place, including a sealed access port for a cheater handle, in accordance with various aspects of the present disclosure.

The valve assembly of FIG. 1 includes a body 102. Body 102 may be the outer casing of valve assembly and may comprise any desired material depending on the desired application for the particular valve assembly. In various examples, body 102 may comprise various metallic materials such as brass, copper, steel, bronze, gunmetal, alloy steels, non-400 series stainless steels, iron or the like. In some examples, body 102, or portions of body 102, may comprise a metal that has a low magnetic permeability. In some examples, the portion of body 102 adjacent to internal actuation member 110 may comprise a metal that has a low magnetic permeability. For example, the metal may comprise aluminum, copper, titanium, and alloys thereof, and may exhibit a relative magnetic permeability (e.g., the ratio of magnetic permeability of a material vs. the magnetic permeability of free space) less than 10. In some embodiments the metal may exhibit a relative magnetic permeability of about 1. In still other examples, body 102 may comprise one or more plastics and/or composite materials. Different materials may be selected for body 102 depending on the desired application for the valve assembly. For example, materials may be selected for body 102 of valve assembly which are resistant to corrosion, heat, moisture, rust, and/or bacterial growth. In various examples, internal actuation member 110 may include internal actuator components 110a, 110b. In various examples, at least one of the internal actuator components 110a, 110b may be operatively coupled to stem 104 such that rotation of internal actuator components 110a, 110b causes rotation of stem 104 (and thus actuation of the valve between and opened and a closed position (or vice versa)).

In various examples, valve body 102 may be sized and shaped so as to define a first enclosure 203. In various examples, an internal mechanism (e.g., stem 104) may be disposed within the first enclosure 203. Additionally, a movable valve member may be positioned in the first enclosure 203. The movable valve member (e.g., valve member 120) may opened and/or closed (e.g., via actuation of the valve) to control fluid flow from port 122 to port 124, or vice versa. In at least some examples, internal actuation member 110 may be disposed in the first enclosure 203 defined by valve body 102. However, in some other examples, (e.g., FIG. 26) the internal actuation member 110 may be disposed in the second enclosure 205 separate from the first enclosure that includes the valve member 120. In some examples, internal actuation member 110 may comprise one or more internal actuator components (e.g., internal actuator components 110a, 110b, etc.).

In some further examples, valve body 102 may be sized and shaped so as to define a second enclosure 205 with a port 153 (sometimes referred to herein as an "access port 153"). A seal may be formed between the first enclosure 203 and the second enclosure 205. For example, seal 154 (sometimes referred to as an "internal seal 154") may be an internal seal formed between the first enclosure 203 including valve member 120 and/or internal actuation member 110, and the second enclosure 205 including and/or defined by port 153. The seal may prevent fluid from passing between the first enclosure 203 and the second enclosure 205 (e.g., fluid flowing between ports 122, 124 may be prevented from entering the second enclosure and port 153).

In various examples, the internal mechanism (e.g., stem 104) may comprise a first end disposed in the first enclosure (e.g., the portions of the stem 104 interfacing with valve member 120) and a second end disposed in the second enclosure (e.g., shaft 150 disposed within port 153). In various examples, the second end may traverse the internal seal 154 (or seal 160 depicted in, for example, FIG. 26) such that a portion of the second end of the internal mechanism (e.g., shaft 150 of stem 104) is disposed within port 153. In various examples, internal seal 154 may comprise an O-ring seal or other gasket. For example, internal seal 154 may be a gasket positioned in or around port 153. In various examples, internal seal 154 may be Teflon tape (or the like) positioned within port 153. The removable plug 152 may be operable to seal the port 153 off from an outside environment of the valve assembly. Accordingly, as depicted in FIG. 1, when plug 152 is seated within the port 153, the second enclosure including shaft 150 is sealed from the outside environment of the valve assembly depicted in FIG. 1.

Body 102 of valve assembly may be formed in such a way as to define an access port 153 that may be sized and shaped so as to be filled by a plug 152. In FIG. 1, plug 152 is depicted as a threaded plug, and hence port 153 may also be threaded. In the example where plug 152 is a threaded plug, plug 152 may be sized and shaped so as to mate with a threaded interior surface of port 153. Alternatively, plug 152 may be welded, brazed, soldered, and/or press fit in port 153, and/or may be held against and/or sealed by a gasket or O-Ring type seal in port 153. In some further examples, plug 152 may be sealed in port 153 using an adhesive or polymer. In various examples, plug 152 may prevent leakage between the inside and outside environment (e.g., between an interior of body 102 and an exterior of body 102). In various examples, the interior of body 102 may refer to an internal portion of body 102 that is not exposed to an exterior of valve assembly, at least while plug 152 is seated within port 153. In various examples, plug 152 may prevent damage to seal 154 due to elements from the outside environment such as sand, dirt, salt, humidity, and/or other contaminants.

Plug 152 and/or port 153 may or may not be threaded depending on the particular embodiment. Seal 154 may be completely enclosed within valve body 102 (as depicted in FIG. 1) or may otherwise be disposed in an interior of valve assembly, at least while plug 152 is seated within port 153. In fact, if seal 154 were to leak when plug 152 is seated in port 153 as shown in FIG. 1 leakage of the valve to the external environment through seal 154 may still be prevented as plug 152 may prevent any fluid or gas that leaked past seal 154 from escaping.

Valve assembly may include an internal mechanism, such as stem 104. Stem 104 may transmit motion from a handle, actuator, and/or other controlling device to a movable valve member 120. For example, in a ball valve (e.g., a valve in which valve member 120 is a ball, as depicted in FIGS. 10-13), stem 104 may be operatively coupled to the ball such that rotating the stem 104 using a handle or other actuator of the valve may, in turn, rotate the ball between an open position and a closed position to control a flow of fluid through the valve. Various types of valves along with their corresponding actuation mechanisms and valve members (sometimes referred to as "discs") may be used in accordance with embodiments of the present disclosure. In a few examples, gate valves, ball valves, globe valves, butterfly valves, plug valves, poppet valves, needle valves, and/or spool valves may be used in accordance with embodiments of the present disclosure depending on the desired valve type.

External magnets 106a, 106b may be disposed on a first portion of the base portion of external actuator 130. A first magnetic pole section of external magnet 106a may be disposed adjacent to a first location of the base portion of external actuator 130. Similarly, a second magnetic pole section (the north pole of external magnet 106b) of external magnet 106b may be disposed adjacent to a second location of the annular base portion of external actuator 130.

Internal actuation member 110 may be mechanically coupled to stem 104. Accordingly, rotation of internal actuation member 110 may rotate stem 104, which may, in turn, actuate movement of valve member 120 between an open position and a closed position in seat 118. As depicted in FIG. 1, internal actuation member 110 may be enclosed within valve body 102 such that internal actuation member 110 is not exposed to the exterior of body 102 of valve assembly. Valve body 102 may define an enclosure. In various examples, internal actuation member 110, stem 104, seal 154, and/or valve member 120 may be disposed within the enclosure. In various examples plug 152 may define a portion of the enclosure. For example, in FIG. 1, when plug 152 is seated in port 153 (as shown), plug 152 and portions of body 102 may prevent leakage through seal 154 between the interior and exterior of valve assembly (e.g., in scenarios in which seal 154 has developed a leak).

Internal actuation member 110 may comprise a material having a high magnetic permeability such that magnetic flux flows from an external magnet (such as, for example, external magnets 106a, 106b) through internal actuation member 110 and returns to either the same external magnet or a different external magnet. In some examples, internal actuation member 110 may comprise one or more ferromagnetic materials such as iron, nickel, cobalt and/or alloys thereof. In another example, internal actuation member 110 may comprise 400 series stainless steel. Although internal actuation member 110 may comprise one or more materials having high magnetic permeability, in various examples, ferromagnetic actuation member may not be a permanent magnet and may not necessarily include permanent magnets. Internal actuation member 110 and/or materials of internal actuation member 110 may be temporarily magnetized while internal actuation member 110 is exposed to magnetic fields of magnetic pole sections of external magnets 106a, 106b.

In some examples, internal actuation member 110 may be non-radially symmetric. For example, internal actuation member 110 may comprise an elongate member with a first end aligned with a first magnetic pole section of external magnet 106a and a second end aligned with a second magnetic pole section of external magnet 106b, in a preferred orientation. Additionally, in some examples, internal actuation member 110 may comprise a material of high magnetic permeability, such as iron or 400 series stainless steel, embedded within a material of low magnetic permeability, such as ceramic. In some examples, the embedded material may form a path within the ceramic material such that magnetic flux flows along the path when a magnetic field interacts with internal actuation member 110.

In some examples, external actuator 130 may comprise a handle, level, or other actuation mechanism effective to rotate external magnets 106a, 106b around body 102. In various examples, motors may be used to turn the handle and/or control actuation of external actuator 130. Generally, when the handle is not being turned or otherwise actuated, the internal actuation member 110 maintains its current position and thus the valve member 120 remains in its current state. Although external actuator 130 is depicted in FIG. 1 as being above the valve body 102, in some examples, external actuator 130 may be in-plane with external magnets 106a, 106b or underneath external magnets 106a, 106b. In some examples, external actuator 130 may comprise a ferromagnetic material to form a return flow path for magnetic flux flowing from external magnet 106a, through internal actuation member 110, to external magnet 106b, and through ferromagnetic external actuator 130 to return to external magnet 106a. It should be appreciated that in various other examples, magnetic flux may flow from external magnet 106b, through internal actuation member 110, to external magnet 106a, and through ferromagnetic external actuator 130 to return to external magnet 106b.

Magnetic flux from external magnets 106a, 106b may be effective to orient internal actuation member 110 in a preferred orientation with respect to the magnetic pole sections of external magnets 106a, 106b.

In still other examples described in further detail below, external magnet 106a may include a north pole section and south pole section. In such an example, magnetic flux may flow from the north pole section of external magnet 106a, through a flux path in internal actuation member 110, and return from internal actuation member 110 to the south pole section of external magnet 106a. Similarly, in another example, external magnet 106b may include a north pole section and south pole section. In such an example, magnetic flux may flow from the north pole section of external magnet 106b, through a flux path in internal actuation member 110, and return from internal actuation member 110 to the south pole section of external magnet 106b.

External magnets 106a and 106b may comprise, for example, permanent magnets such as Neodymium Iron Boron magnets, Samarium Cobalt magnets, Alnico magnets, Ceramic and/or Ferrite magnets. Examples of different Neodymium magnets may include N42, N52, and N42SH grade Neodymium magnets. Different magnets may exhibit different magnetic field strengths (in terms of Gauss and/or Teslas) and different pull forces. As such, different magnets may produce different amounts of torque in internal actuation member 110 when the magnets are rotated around body 102 of valve assembly. In some examples, external magnets 106a and/or 106b may comprise combinations of different permanent magnets. Additionally, in some examples, external magnets 106a and/or 106b may comprise electromagnets. In an example, a typical Neodymium N42 magnet might have dimensions of 1"×2"×½".

External magnets 106a and/or 106b may exhibit different Curie temperatures depending on the particular types of magnets used. A Curie temperature is the temperature at or above which a magnet becomes demagnetized. After the temperature of a magnet drops below the Curie temperature, the magnet may no longer behave as it did prior to reaching the Curie temperature, or temperatures above the Curie temperature. In the examples described in the present disclosure, magnets are included in the external portions of the various valves, but may not be included within body 102. Such a configuration may be advantageous if the valves are welded, soldered, and/or brazed during installation and/or repair. If the valves are to be subjected to temperatures above the Curie temperature for the particular external magnets, the external magnets may be removed prior to heating the valve in order to avoid demagnetizing the external magnets. The external magnets may thereafter be reattached after the valve has returned to the rated operating temperature range for the particular external magnets used with the valve. The valve may thereafter be actuated using the various techniques described in the present disclosure. In some examples, body 102 of valve assembly and/or the external magnets 106a, 106b may be heat-shielded using insulating materials to prevent hot material passing through the valves (e.g., steam or other hot liquids) from demagnetizing the external magnets 106a, 106b. In some other examples, valves in accordance with the present disclosure may include one or more heat sinks (such as radiators and/or fins) to dissipate heat caused by hot material passing through the valves in order to prevent demagnetization of external magnets 106a, 106b.

Because internal actuation member 110 is not a permanent magnet, internal actuation member 110 may be heated without losing its ferromagnetic properties. Additionally, by sealing stem 104 within body 102 of valve assembly, a stem seal is avoided. A stem seal is an interface through which a stem passes between the interior of a valve and the exterior of the valve. Dirt and/or other contaminants can be introduced at the stem seal and can cause a leak in the stem seal. As such, for many applications it may be advantageous to seal the stem within the body of the valve assembly, as described herein.

Valve assembly may include ports 122 and 124. Although in the example depicted in FIG. 1, two ports are shown, more ports may be used depending on the particular valve. Ports 122 and 124 may be inlet and/or outlet ports. Additionally, in some examples, ports 122 and 124 may be interchangeable as inlet ports and outlet ports depending on the way valve assembly is installed in a system.

Figure 2:
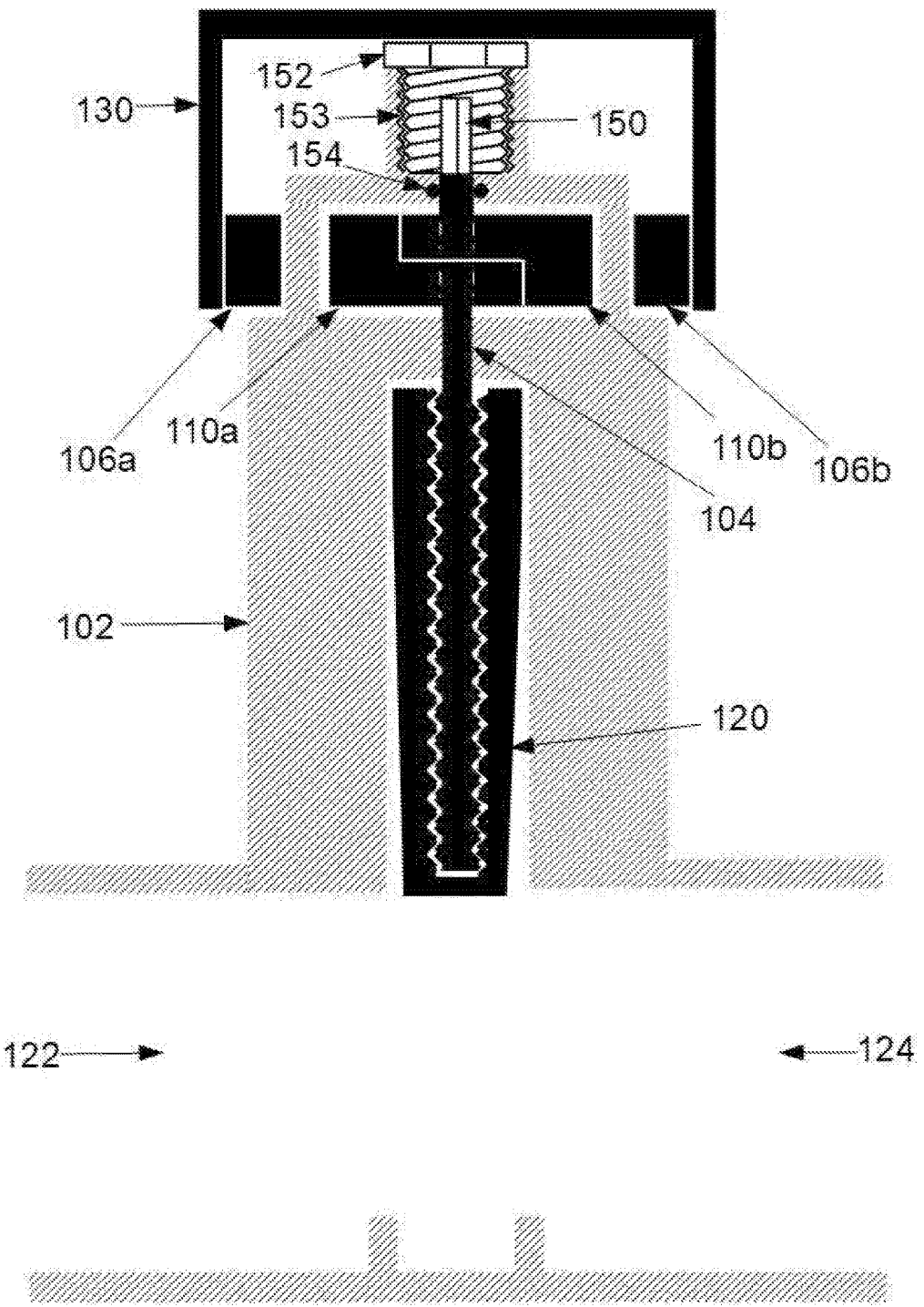
FIG. 2 depicts an assembled side cut-away view of the ferromagnetic magnet-actuated gate valve of FIG. 1 in the open position, with the external magnetic actuator in place, including a sealed access port for a cheater handle, in accordance with various aspects of the present disclosure.

FIG. 2 depicts an assembled side cut-away view of the ferromagnetic magnet-actuated gate valve of FIG. 1 in the open position, with the external magnetic actuator in place, including a sealed access port 153 for a cheater handle (not shown in FIG. 2), in accordance with various aspects of the present disclosure. Those components in FIG. 2 that have been described previously with reference to FIG. 1 may not be described again for purposes of clarity and brevity.

Figure 3:
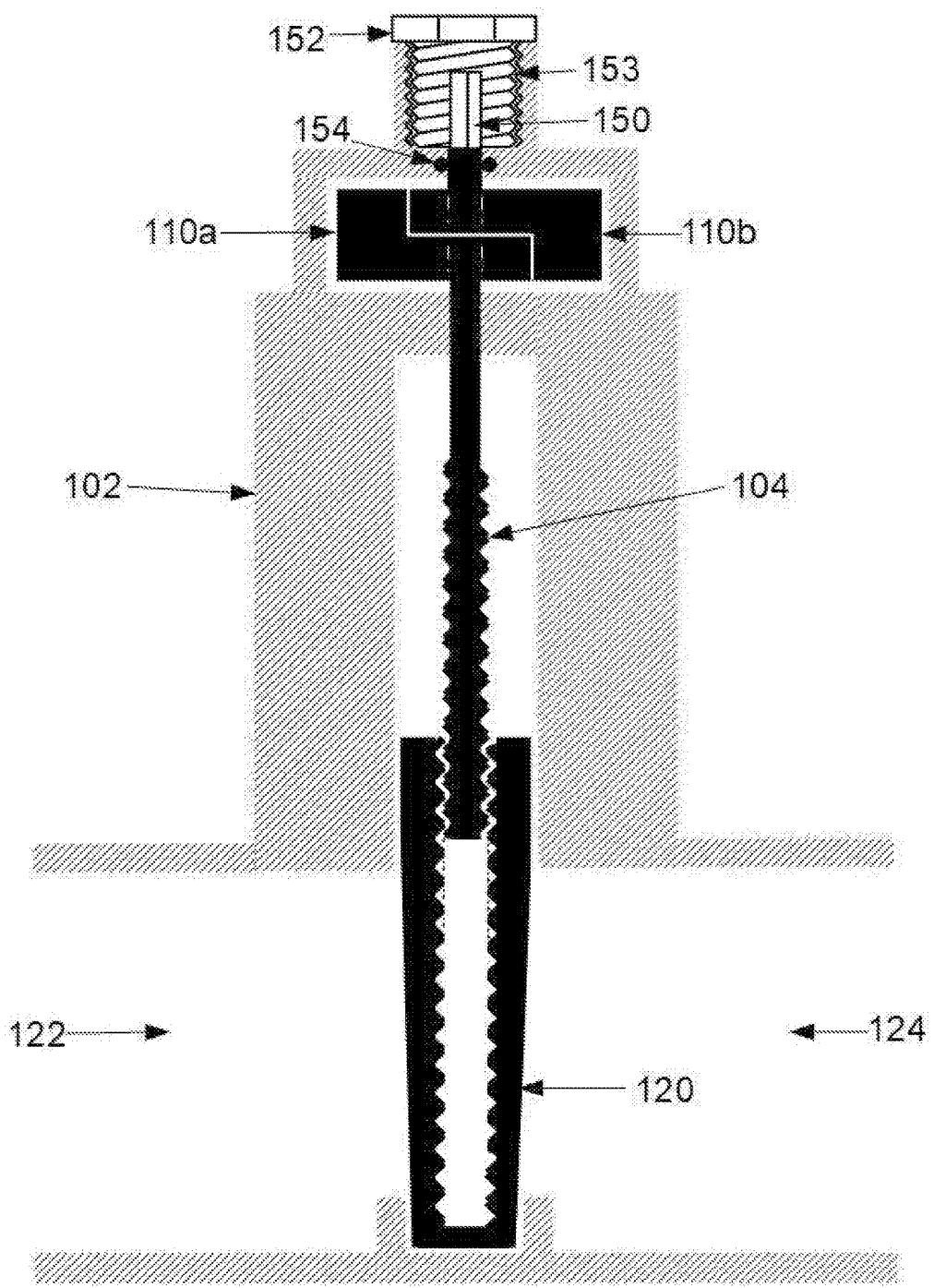
FIG. 3 depicts an assembled side cut-away view of the ferromagnetic magnet-actuated gate valve of FIGS. 1-2 in the closed position, with the external magnetic actuator removed, including a sealed access port for a cheater handle, in accordance with various aspects of the present disclosure.

FIG. 3 depicts an assembled side cut-away view of a ferromagnetic magnet-actuated gate valve of FIGS. 1-2 in the closed position, with the external actuator 130 removed, including a sealed access port 153 for a cheater handle (not shown in FIG. 3), in accordance with various aspects of the present disclosure. The external actuator 130 (FIG. 2) may be removed in order to expose a portion of plug 152 so that plug 152 may be removed from port 153. Alternatively, in some other embodiments of the invention, the external actuator 130 may be left in place while the port 153 is accessed. Those components in FIG. 3 that have been described previously with reference to FIGS. 1 and 2 may not be described again for purposes of clarity and brevity.

Figure 4:
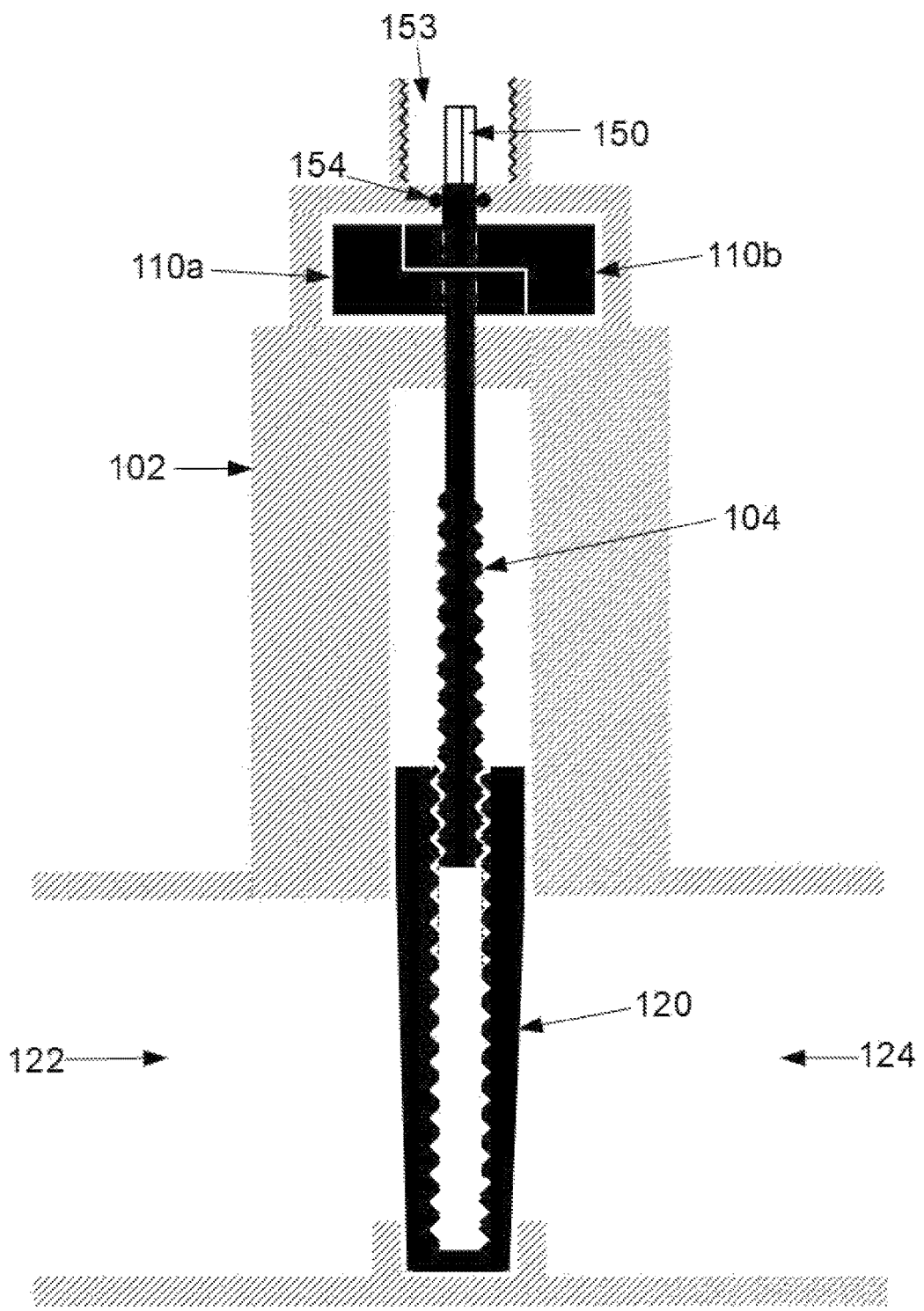
FIG. 4 depicts an assembled side cut-away view of the ferromagnetic magnet-actuated gate valve of FIGS. 1-3 in the closed position, with the external magnetic actuator and cheater port plug removed, showing an open access port for a cheater handle, in accordance with various aspects of the present disclosure.

FIG. 4 depicts an assembled side cut-away view of the ferromagnetic magnet-actuated gate valve of FIGS. 1-3 in the closed position, with the external actuator 130 and plug 152 removed, showing an open access port for a cheater handle, in accordance with various aspects of the present disclosure. In FIG. 4 the plug 152 has been removed from port 153 to expose shaft 150. In various examples, a cheater handle may be coupled to shaft 150 in order to actuate the valve mechanically using the cheater handle, as described in further detail below. With plug 152 removed, seal 154 prevents fluid or gas from escaping from the valve around shaft 150 and through the open port 153. Those components in FIG. 4 that have been described previously with reference to FIGS. 1-3 may not be described again for purposes of clarity and brevity.

Figure 5:
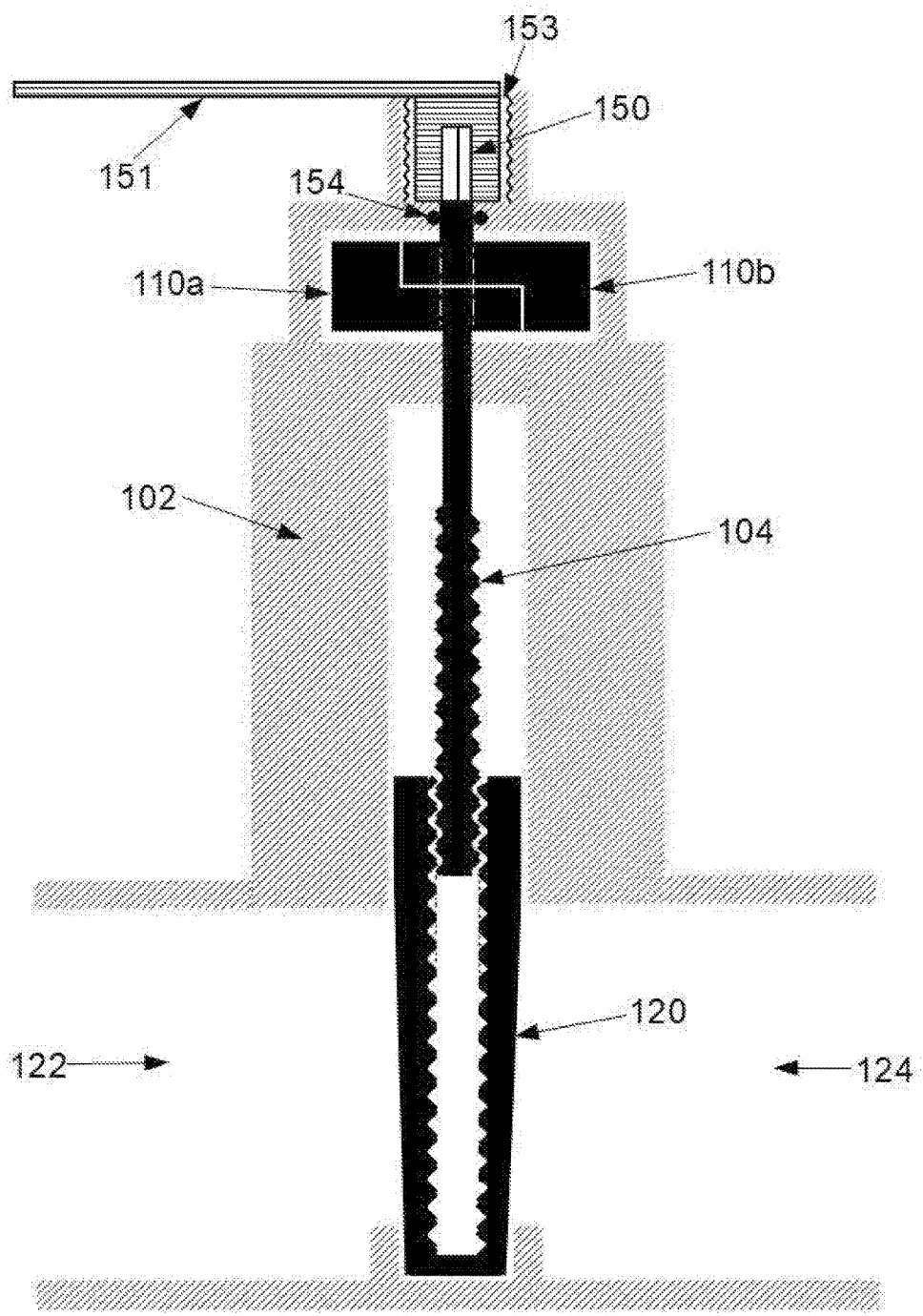
FIG. 5 depicts an assembled side cut-away view of the ferromagnetic magnet-actuated gate valve of FIGS. 1-4 in the closed position, including a cheater handle in the access port, with the external magnetic actuator and cheater port plug removed, in accordance with various aspects of the present disclosure.

FIG. 5 depicts an assembled side cut-away view of the ferromagnetic magnet-actuated gate valve of FIGS. 1-4 in the closed position, including a cheater handle 151 in the access port, with the external actuator 130 (not shown in FIG. 5) and the plug 152 (not shown in FIG. 5) removed, in accordance with various aspects of the present disclosure. In FIG. 5 cheater handle 151 is coupled to (e.g., mated to) shaft 150. In various examples, cheater handle 151 may comprise a mechanical lever. Cheater handle 151 may further comprise an interfacing portion that is sized and shaped so as to interface with a portion of shaft 150.

Seal 154 prevents fluid or gas from escaping from the valve around shaft 150 and out port 153. Shaft 150 may be mechanically coupled to stem 104. Accordingly, rotation of shaft 150 (e.g., via cheater handle 151) may rotate stem 104 and may actuate the valve between the open and closed positions. The lever portion of cheater handle 151 may allow for greater torque to be applied to shaft 150 and thereby to stem 104 relative to magnetic actuation via external actuator 130. Accordingly, cheater handle 151 may be used to "over-torque" the valve in order to "unstick" the valve if the valve has become stuck in a particular position (e.g., open, closed, or an intermediate position). Those components in FIG. 5 that have been described previously with reference to FIGS. 1-4 may not be described again for purposes of clarity and brevity.

Figure 6:
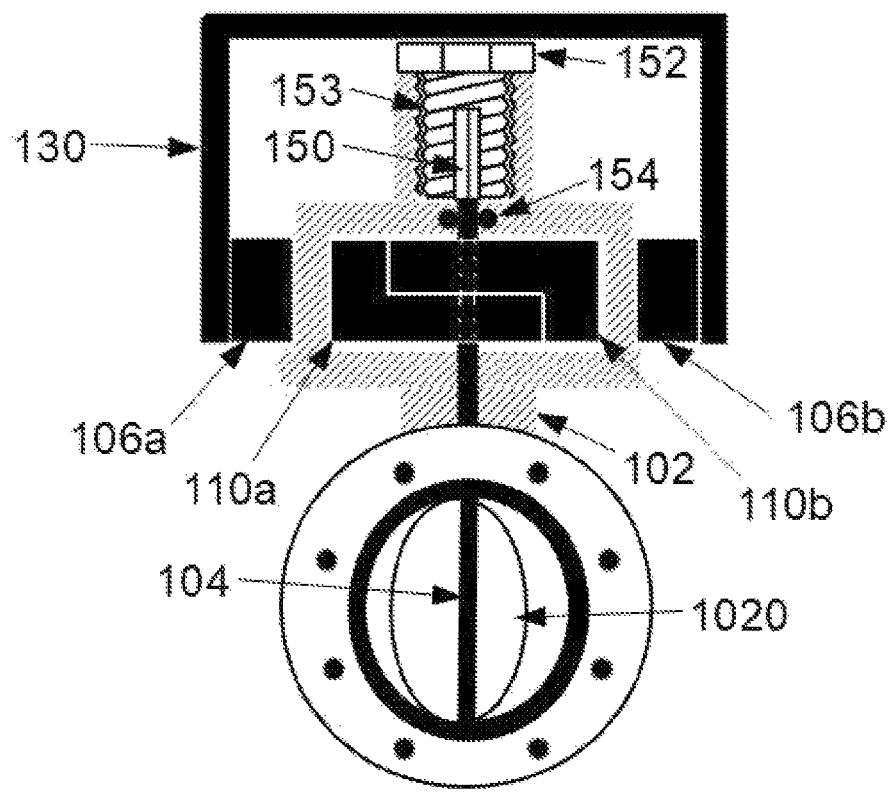
FIG. 6 depicts an assembled cut-away view of a ferromagnetic magnet-actuated butterfly valve in a partially open position, with the external magnetic actuator in place, including a sealed access port for a cheater handle, in accordance with various aspects of the present disclosure.

FIG. 6 depicts an assembled cut-away view of a ferromagnetic magnet-actuated butterfly valve in a partially open position, with the external magnetic actuator in place, including a sealed access port for a cheater handle, in accordance with various aspects of the present disclosure. Those components in FIG. 6 that have been described previously with reference to FIGS. 1-5 may not be described again for purposes of clarity and brevity. In the magnet-actuated butterfly valve depicted in FIG. 6, the valve member 120 may be a plate 1020 configured to rotate between an open and a shut configuration with the rotation of stem 104. Stem 104 may, in turn, be coupled to and rotate with internal actuation member 110. As previously discussed, internal actuation member 110 may rotate due to torque caused by rotation of external magnets 106a, 106b. In FIG. 6, plug 152 is seated in port 153, thereby precluding access to shaft 150 and preventing leakage from the interior of the valve to the exterior of the valve even in the event that seal 154 fails.

Figure 7:
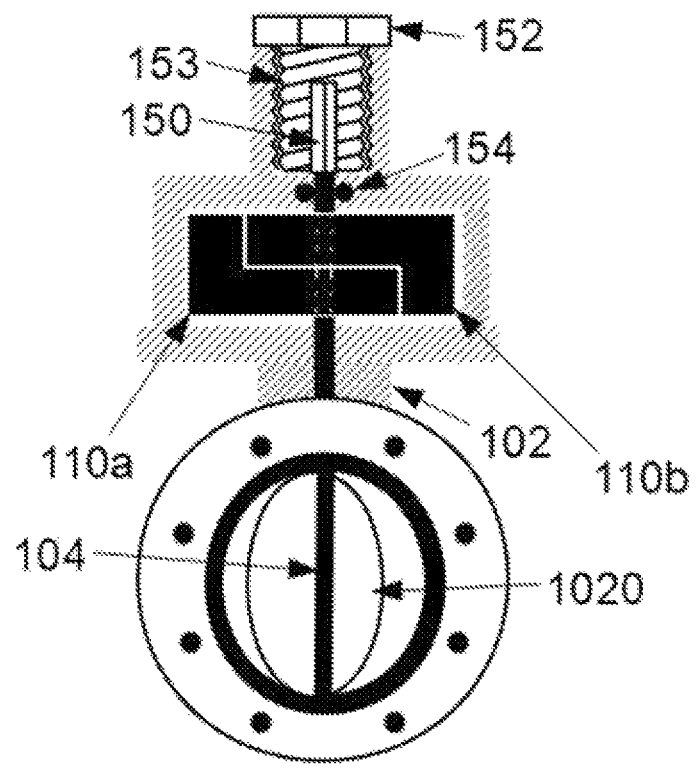
FIG. 7 depicts an assembled cut-away view of the ferromagnetic magnet-actuated butterfly valve of FIG. 6 in a partially open position, with the external magnetic actuator removed, including a sealed access port for a cheater handle, in accordance with various aspects of the present disclosure.

FIG. 7 depicts an assembled cut-away view of the ferromagnetic magnet-actuated butterfly valve of FIG. 6 in a partially open position, with the external actuator 130 (FIG. 6) removed, including a sealed access port 153 for a cheater handle, in accordance with various aspects of the present disclosure. Those components in FIG. 7 that have been described previously with reference to FIGS. 1-6 may not be described again for purposes of clarity and brevity. The external actuator 130 may be removed in preparation for removing plug 152 from port 153 in order to expose shaft 150. Alternatively, in some other embodiments, the external actuator 130 may be left in place while the port 153 is accessed.

Figure 8:
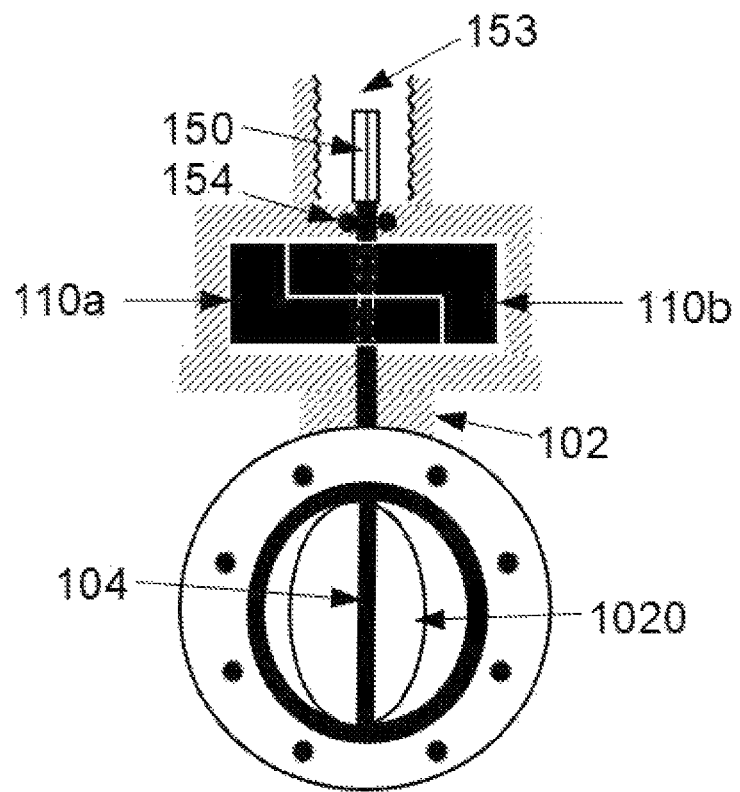
FIG. 8 depicts an assembled cut-away view of the ferromagnetic magnet-actuated butterfly valve of FIGS. 6-7 in a partially open position, with the external magnetic actuator and cheater port plug removed, showing an open access port for a cheater handle, in accordance with various aspects of the present disclosure.

FIG. 8 depicts an assembled cut-away view of the ferromagnetic magnet-actuated butterfly valve of FIGS. 6-7 in a partially open position, with the external actuator 130 (not shown in FIG. 8) and plug 152 (not shown in FIG. 8) removed, showing an open access port 153 for a cheater handle (not shown in FIG. 8), in accordance with various aspects of the present disclosure. In FIG. 8 the plug 152 has been removed from port 153 to expose shaft 150. In various examples, a cheater handle may be coupled to shaft 150 in order to actuate the valve mechanically using a cheater handle. With plug 152 removed, seal 154 prevents fluid or gas from escaping from the valve around shaft 150 and through the open port 153. Those components in FIG. 8 that have been described previously with reference to FIGS. 1-7 may not be described again for purposes of clarity and brevity.

Figure 9:
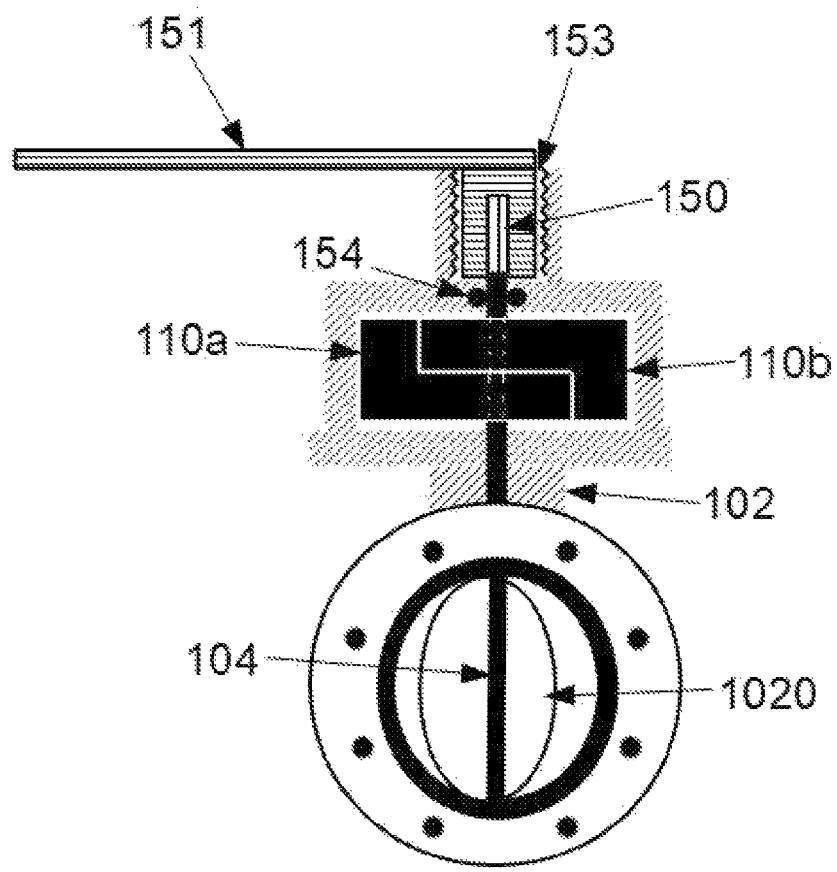
FIG. 9 depicts an assembled cut-away view of the ferromagnetic magnet-actuated butterfly valve of FIGS. 6-8 in a partially open position, including a cheater handle in the access port, with the external magnetic actuator and cheater port plug removed, in accordance with various aspects of the present disclosure.

FIG. 9 depicts an assembled cut-away view of the ferromagnetic magnet-actuated butterfly valve of FIGS. 6-8 in a partially open position, including a cheater handle 151 in the access port 153, with the external actuator 130 (not shown in FIG. 9) and plug 152 (not shown in FIG. 9) removed, in accordance with various aspects of the present disclosure. In FIG. 9 cheater handle 151 is coupled to (e.g., mated to) shaft 150. Seal 154 prevents fluid or gas from escaping from the valve around shaft 150 and out port 153. Shaft 150 may be mechanically coupled to stem 104. Accordingly, rotation of shaft 150 (e.g., via cheater handle 151) may rotate stem 104 and may actuate the valve between the open and closed positions. The lever portion of cheater handle 151 may allow for greater torque to be applied to shaft 150 and thereby to stem 104 relative to magnetic actuation via external actuator 130. Accordingly, cheater handle 151 may be used to "over-torque" the valve in order to "unstick" the valve if the valve has become stuck in a particular position (e.g., open, closed, or an intermediate position). Those components in FIG. 9 that have been described previously with reference to FIGS. 1-8 may not be described again for purposes of clarity and brevity.

Figure 10:
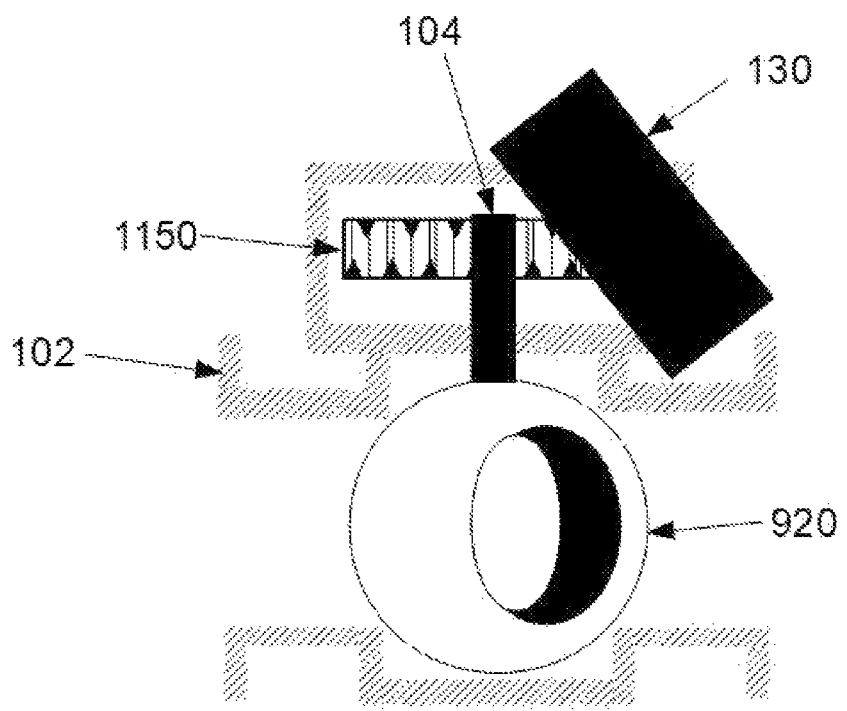
FIG. 10 depicts an assembled side cut-away view of a ferromagnetic magnet-actuated worm gear driven ball valve in a partially open position, with the external magnetic actuator in place, including a sealed access port for a cheater handle, in accordance with various aspects of the present disclosure.

FIG. 10 depicts an assembled side cut-away view of a ferromagnetic magnet-actuated worm gear driven ball valve in a partially open position, with the external magnetic actuator in place, including a sealed access port for a cheater handle, in accordance with various aspects of the present disclosure.

Those components in FIG. 10 that have been described previously with reference to FIGS. 1-9 may not be described again for purposes of clarity and brevity. In the magnet-actuated ball valve depicted in FIG. 10, the valve member 120 may be a ball 920 configured to rotate between an open and a shut configuration with rotation of the stem 104. As previously discussed, an internal valve member may rotate due to torque caused by rotation of external actuator 130 and magnets included therein. The valve of FIG. 10 comprises an internal mechanism that is geared down by a worm gear and a corresponding worm to allow higher rotation speeds and lower torque at the magnetic actuator (e.g., the magnetic coupling between external actuator 130 and internal actuation member 110) while increasing the torque using the worm gear mechanism to produce an increased torque to rotate the ball valve member.

Various valve types, such as ball valves and/or butterfly valves, may require higher torque to actuate relative to other types of valves, such as gate valves. In some examples, a worm gear mechanism may be used to impart higher torque to actuation. As depicted in FIG. 10, an actuation mechanism of a valve may include a worm gear 1150. In the ball valve depicted in FIG. 10, the worm gear is part of an internal gear mechanism within body 102 of the ball valve. Turning worm gear 1150 may actuate the ball 920 between an open and a closed position.

Figure 11:
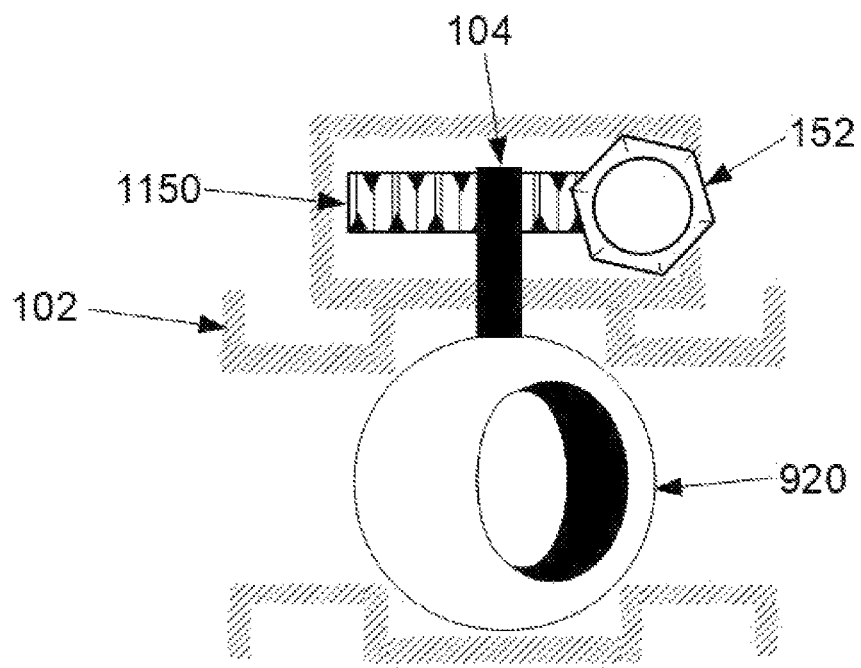
FIG. 11 depicts an assembled side cut-away view of the ferromagnetic magnet-actuated worm gear driven ball valve of FIG. 10 in a partially open position, with the external magnetic actuator removed, including a sealed access port for a cheater handle, in accordance with various aspects of the present disclosure.

FIG. 11 depicts an assembled side cut-away view of the ferromagnetic magnet-actuated worm gear driven ball valve of FIG. 10 in a partially open position, with the external actuator 130 removed, including a sealed access port 153 for a cheater handle (not shown in FIG. 11), in accordance with various aspects of the present disclosure. The external actuator 130 may be removed in order to expose a portion of plug 152 so that plug 152 may be removed from port 153. Alternatively, in some other embodiments of the invention, the external actuator 130 may be left in place while the port 153 is accessed. Those components in FIG. 11 that have been described previously with reference to FIGS. 1-10 may not be described again for purposes of clarity and brevity.

Figure 12:
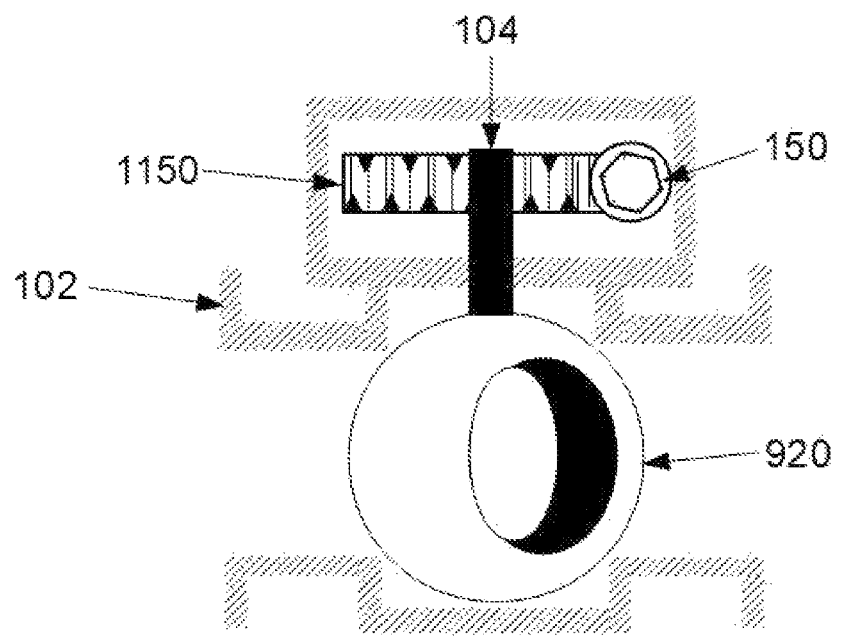
FIG. 12 depicts an assembled side cut-away view of the ferromagnetic magnet-actuated worm gear driven ball valve of FIGS. 10-11 in a partially open position, with the external magnetic actuator and cheater port plug removed, showing an open access port for a cheater handle, in accordance with various aspects of the present disclosure.

FIG. 12 depicts an assembled side cut-away view of the ferromagnetic magnet-actuated worm gear driven ball valve of FIGS. 10-11 in a partially open position, with the external actuator 130 and plug 152 removed, showing an open access port for a cheater handle, in accordance with various aspects of the present disclosure. In FIG. 12 the plug 152 has been removed from port 153 to expose shaft 150. In various examples, a cheater handle may be coupled to shaft 150 in order to actuate the valve mechanically using the cheater handle. With plug 152 removed, seal 154 prevents fluid or gas from escaping from the valve around shaft 150 and through the open port 153. Those components in FIG. 12 that have been described previously with reference to FIGS. 1-11 may not be described again for purposes of clarity and brevity.

Figure 13:
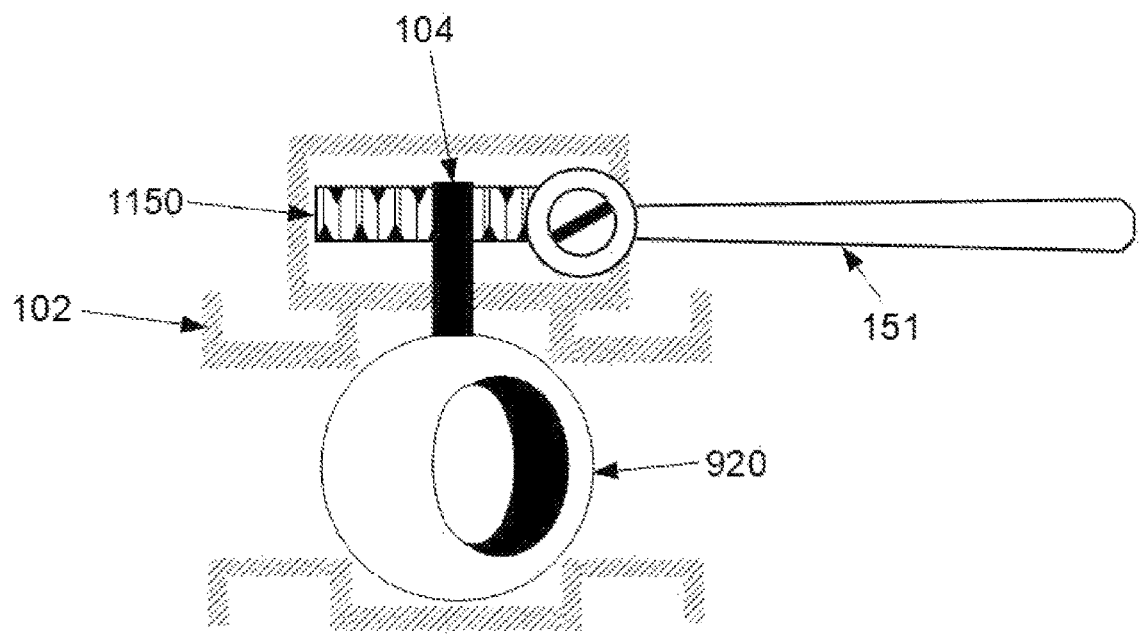
FIG. 13 depicts an assembled side cut-away view of the ferromagnetic magnet-actuated worm gear driven ball valve of FIGS. 10-12 in a partially open position, including a cheater handle in the access port, with the external magnetic actuator and cheater port plug removed, in accordance with various aspects of the present disclosure.

FIG. 13 depicts an assembled side cut-away view of the ferromagnetic magnet-actuated worm gear driven ball valve of FIGS. 10-12 in a partially open position, including a cheater handle 151 in the access port 153, with the external actuator 130 (not shown in FIG. 13) and the plug 152 (not shown in FIG. 13) removed, in accordance with various aspects of the present disclosure. In FIG. 13 cheater handle 151 is coupled to (e.g., mated to) shaft 150 (not visible in FIG. 13). Seal 154 prevents fluid or gas from escaping from the valve around shaft 150 and out port 153. Shaft 150 may be mechanically coupled to stem 104. Accordingly, rotation of shaft 150 (e.g., via cheater handle 151) may rotate stem 104 and may actuate the valve between the open and closed positions. The lever portion of cheater handle 151 may allow for greater torque to be applied to shaft 150 and thereby to stem 104 relative to magnetic actuation via external actuator 130. Accordingly, cheater handle 151 may be used to "over-torque" the valve in order to "unstick" the valve if the valve has become stuck in a particular position (e.g., open, closed, or an intermediate position). Those components in FIG. 13 that have been described previously with reference to FIGS. 1-12 may not be described again for purposes of clarity and brevity.

Figure 14:
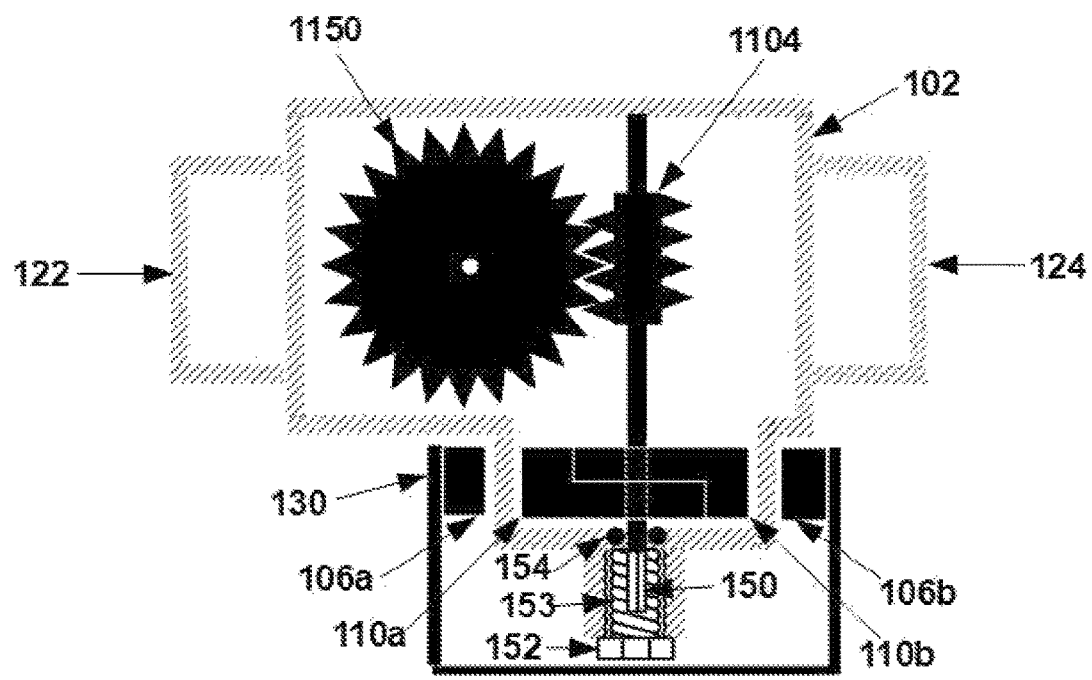
FIG. 14 depicts an assembled cut-away view as seen from the top of the valve (along the axis of rotation of the valve element) of a ferromagnetic magnet-actuated ball valve, with the external magnetic actuator in place, including an internal worm gear mechanism, and a sealed access port for a cheater handle, in accordance with various aspects of the present disclosure.

FIG. 14 depicts an assembled cut-away view as seen from the top of the valve (along the axis of rotation of the valve element) of a ferromagnetic magnet-actuated ball valve, with the external actuator 130 in place, including an internal worm gear mechanism, and a sealed access port 153 for a cheater handle, in accordance with various aspects of the present disclosure. Those components in FIG. 14 that have been described previously with reference to FIGS. 1-13 may not be described again for purposes of clarity and brevity.

Various valve types, such as ball valves and/or butterfly valves, may require higher torque to actuate relative to other types of valves, such as gate valves. In some examples, a worm gear mechanism may be used to impart higher torque to actuation. As depicted in FIG. 14, an actuation mechanism of a valve may include a stem 1104 with a helical ridge (sometimes referred to as a "worm") effective to turn a worm gear 1150. The worm gear 1150 may produce an increased torque when rotated relative to rotation of stem 1104 alone. In the ball valve depicted in FIG. 14, the worm gear is part of an internal gear mechanism within body 102 of the ball valve. Turning worm gear 1150 may actuate the valve member between an open and a closed position.

Figure 15:
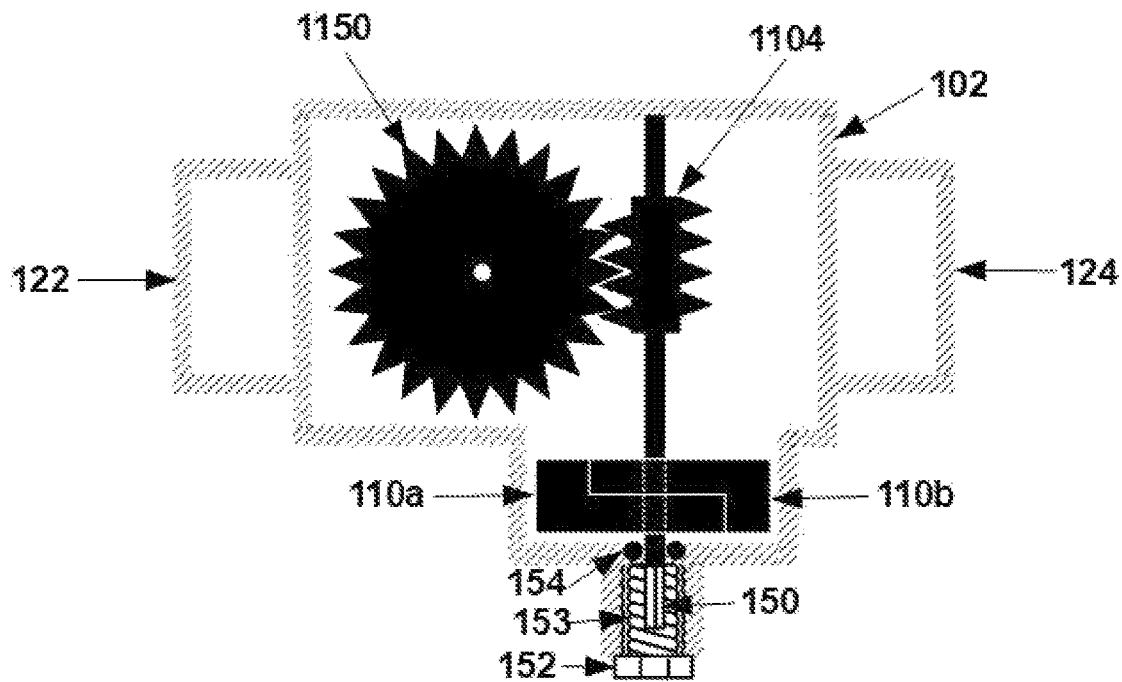
FIG. 15 depicts an assembled cut-away view as seen from the top of the valve (along the axis of rotation of the valve element) of the ferromagnetic magnet-actuated ball valve of FIG. 14, with the external magnetic actuator removed, including an internal worm gear mechanism, and a sealed access port for a cheater handle, in accordance with various aspects of the present disclosure.

FIG. 15 depicts an assembled cut-away view as seen from the top of the valve (along the axis of rotation) of the ferromagnetic magnet-actuated ball valve of FIG. 14, with the external actuator 130 removed, including an internal worm gear mechanism, and a sealed access port 153 for a cheater handle, in accordance with various aspects of the present disclosure. Those components in FIG. 15 that have been described previously with reference to FIGS. 1-14 may not be described again for purposes of clarity and brevity. The external actuator 130 (FIG. 14) may be removed in order to expose a portion of plug 152 so that plug 152 may be removed from port 153. Alternatively, in some other embodiments of the invention, the external actuator 130 may be left in place while the port 153 is accessed.

Figure 16:
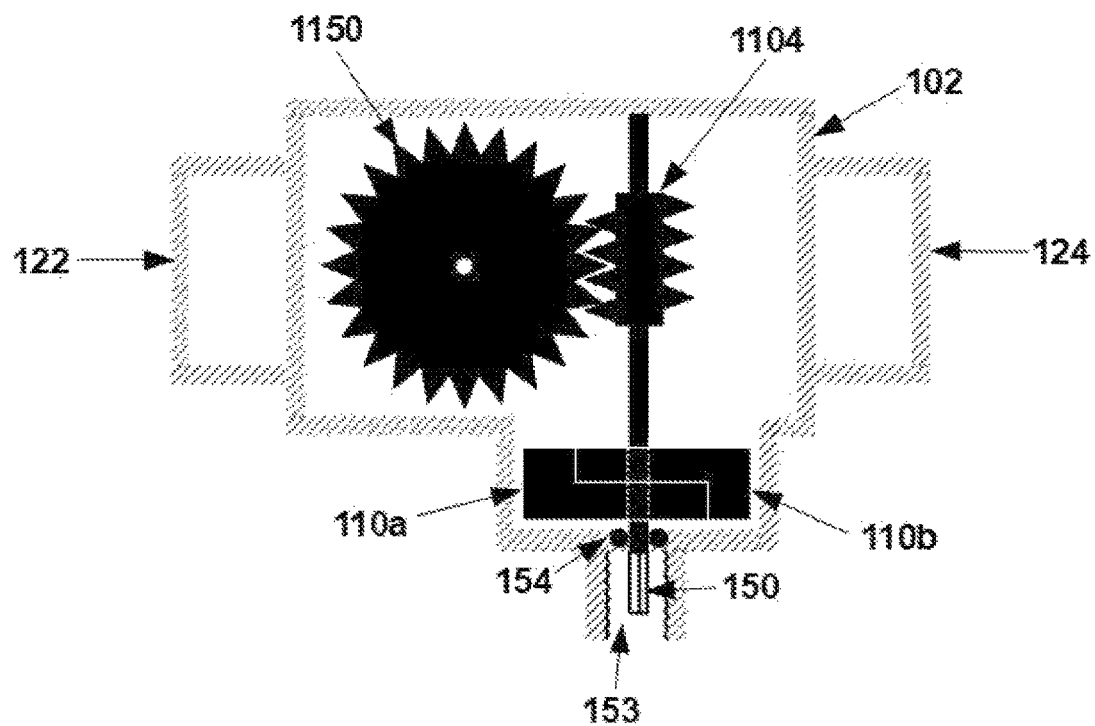
FIG. 16 depicts an assembled cut-away view as seen from the top of the valve (along the axis of rotation of the valve element) of the ferromagnetic magnet-actuated ball valve of FIGS. 14-15, including an internal worm gear mechanism, with the external magnetic actuator and cheater port plug removed, showing an open access port for a cheater handle, in accordance with various aspects of the present disclosure.

FIG. 16 depicts an assembled cut-away view as seen from the top of the valve (along the axis of rotation of the valve element) of the ferromagnetic magnet-actuated ball valve of FIGS. 14-15, including an internal worm gear mechanism, with the external actuator 130 and plug 152 removed, showing an open access port 153 for a cheater handle, in accordance with various aspects of the present disclosure. In FIG. 16 the plug 152 has been removed from port 153 to expose shaft 150. In various examples, a cheater handle may be coupled to shaft 150 in order to actuate the valve mechanically using the cheater handle, as described in further detail below. With plug 152 removed, seal 154 prevents fluid or gas from escaping from the valve around shaft 150 and through the open port 153. Those components in FIG. 16 that have been described previously with reference to FIGS. 1-15 may not be described again for purposes of clarity and brevity.

Figure 17:
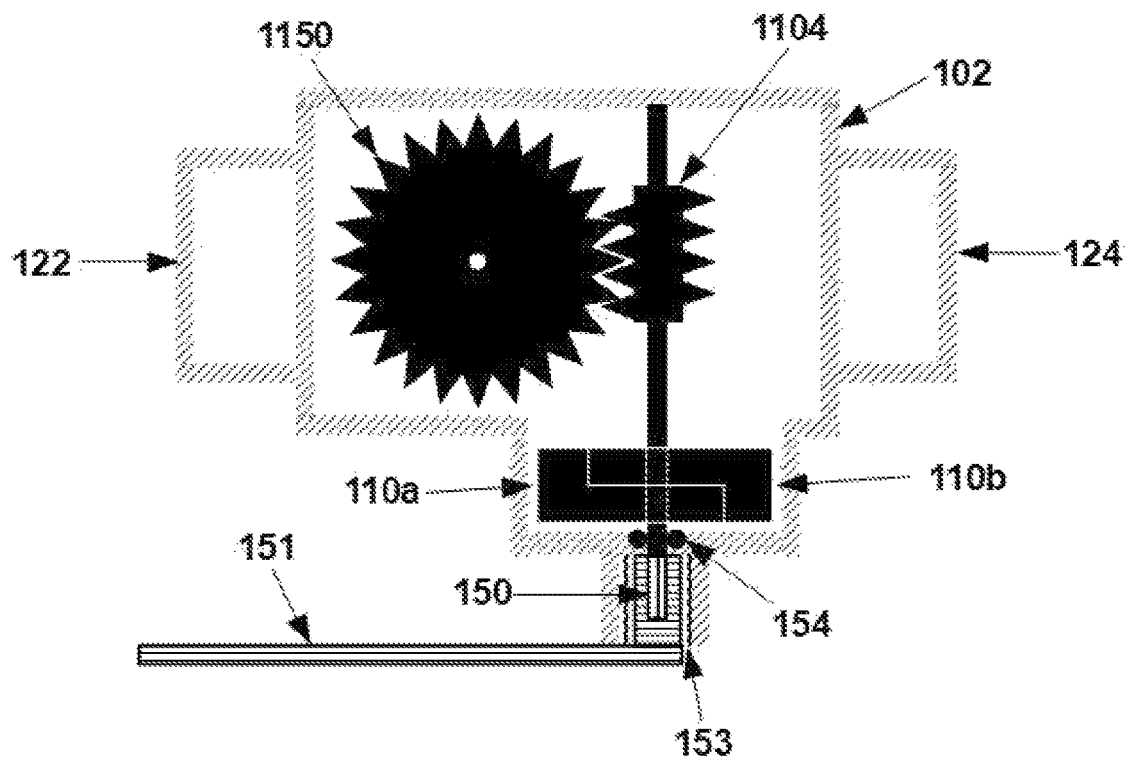
FIG. 17 depicts an assembled cut-away view as seen from the top of the valve (along the axis of rotation of the valve element) of the ferromagnetic magnet-actuated ball valve of FIGS. 14-16, including an internal worm gear mechanism, with the external magnetic actuator and cheater port plug removed, including a cheater handle in the access port, in accordance with various aspects of the present disclosure.

FIG. 17 depicts an assembled cut-away view as seen from the top of the valve (along the axis of rotation of the valve element) of the ferromagnetic magnet-actuated ball valve of FIGS. 14-16, including an internal worm gear mechanism, with the external actuator 130 and plug 152 removed, including a cheater handle 151 in the access port, in accordance with various aspects of the present disclosure. In FIG. 17 cheater handle 151 is coupled to (e.g., mated to) shaft 150. Seal 154 prevents fluid or gas from escaping from the valve around shaft 150 and out port 153. Shaft 150 may be mechanically coupled to stem 104. Accordingly, rotation of shaft 150 (e.g., via cheater handle 151) may rotate stem 104 and may actuate the valve between the open and closed positions. The lever portion of cheater handle 151 may allow for greater torque to be applied to shaft 150 and thereby to stem 104 relative to magnetic actuation via external actuator 130. Accordingly, cheater handle 151 may be used to "over-torque" the valve in order to "unstick" the valve if the valve has become stuck in a particular position (e.g., open, closed, or an intermediate position). Those components in FIG. 17 that have been described previously with reference to FIGS. 1-16 may not be described again for purposes of clarity and brevity.

Figure 18:
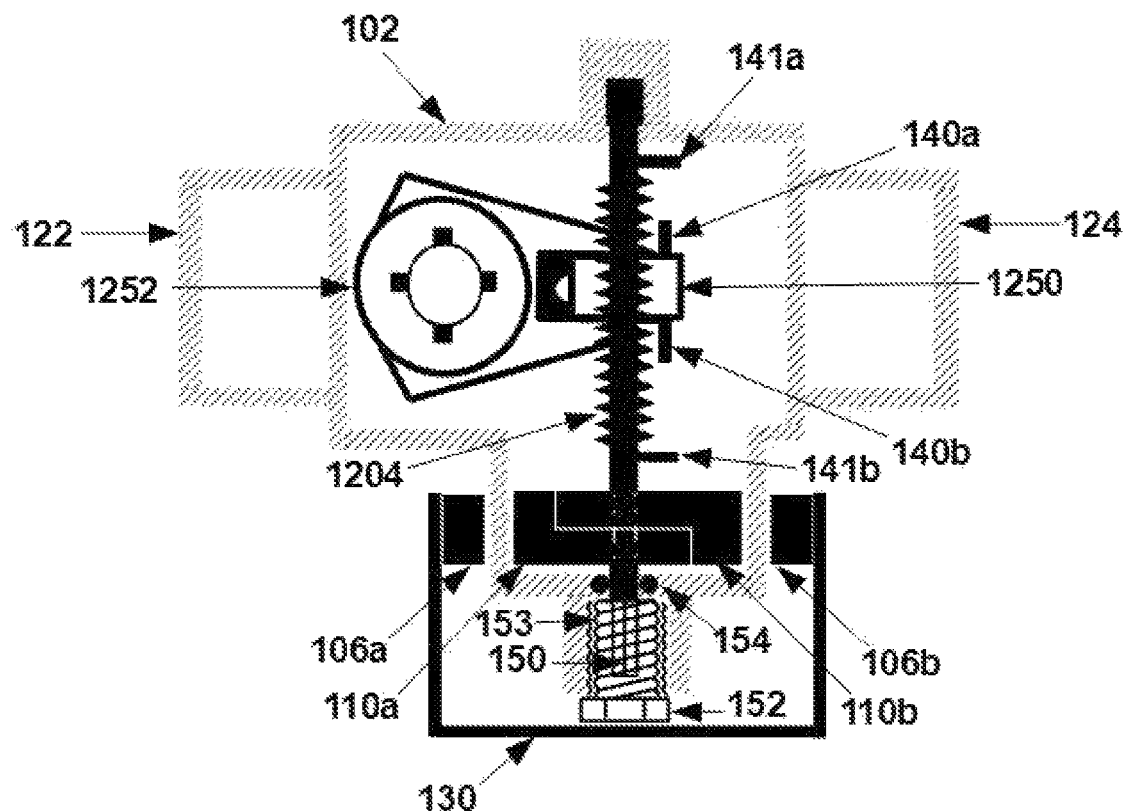
FIG. 18 depicts an assembled cut-away view as seen from the top of the valve (along the axis of rotation of the valve element) of a ferromagnetic magnet-actuated ball valve, with the external magnetic actuator in place, including an internal traveling nut mechanism, and a sealed access port for a cheater handle, in accordance with various aspects of the present disclosure. In various examples, stop pins 140*a*, 141*a*, 140*b*, 141*b* may be used to prevent the traveling nut mechanism from over-tightening and becoming stuck in either an open or closed position.

FIG. 18 depicts an assembled cut-away view as seen from the top of the valve (along the axis of rotation of the valve element) of a ferromagnetic magnet-actuated ball valve, with the external actuator 130 in place, including an internal traveling nut mechanism, and a sealed access port 153 for a cheater handle, in accordance with various aspects of the present disclosure. Those components in FIG. 18 that have been described previously with reference to FIGS. 1-17 may not be described again for purposes of clarity and brevity.

In various valve types that require more torque to operate, a traveling nut architecture internal mechanism may be used to increase the torque provided by the magnetic actuation mechanism (e.g., the magnetic coupling between external magnets 106a, 106b and internal actuation member 110) described herein. The actuation mechanism of a valve may include a stem 1204 with a helical ridge mated to a traveling nut 1250. As internal actuation member 110 rotates, traveling nut 1250 may move up (or down, depending on the direction of rotation) stem 1204. Upwards and downwards movement of traveling nut 1250 may, in turn, rotate a lever 1252. The lever 1252 may produce an increased torque when rotated relative to rotation of stem 1204 alone. Turning lever 1252 may actuate the valve member between an open and a closed position.

Figure 19:
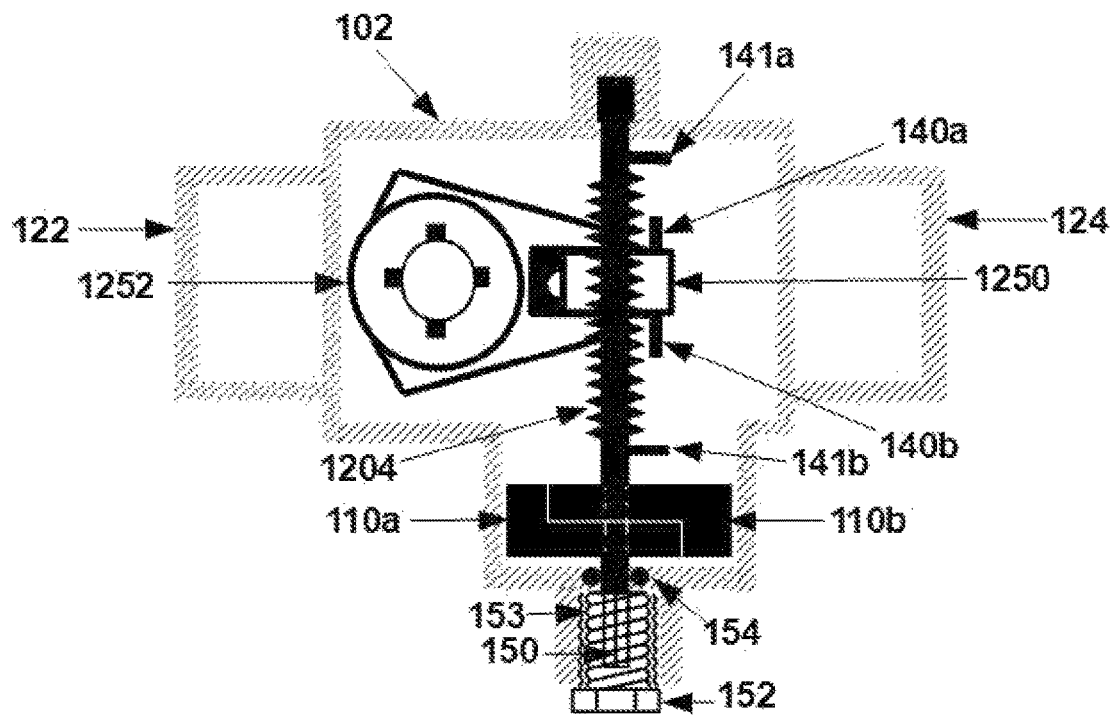
FIG. 19 depicts an assembled cut-away view as seen from the top of the valve (along the axis of rotation of the valve element) of the ferromagnetic magnet-actuated ball valve of FIG. 18, with the external magnetic actuator removed, including an internal traveling nut mechanism, and a sealed access port for a cheater handle, in accordance with various aspects of the present disclosure.

FIG. 19 depicts an assembled cut-away view as seen from the top of the valve (along the axis of rotation of the valve element) of the ferromagnetic magnet-actuated ball valve of FIG. 18, with the external actuator 130 (not shown in FIG. 19) removed, including an internal traveling nut mechanism, and a sealed access port 153 for a cheater handle, in accordance with various aspects of the present disclosure. In various examples, higher rotation speeds and lower torque may be used to actuate the magnetic actuator of the valve architecture depicted in FIG. 19, while the internal traveling nut mechanism may increase the torque to rotate the ball valve member. Those components in FIG. 19 that have been described previously with reference to FIGS. 1-18 may not be described again for purposes of clarity and brevity. The external actuator 130 (FIG. 18) may be removed in order to expose a portion of plug 152 so that plug 152 may be removed from port 153. Alternatively, in some other embodiments of the invention, the external actuator 130 may be left in place while the port 153 is accessed.

Figure 20:
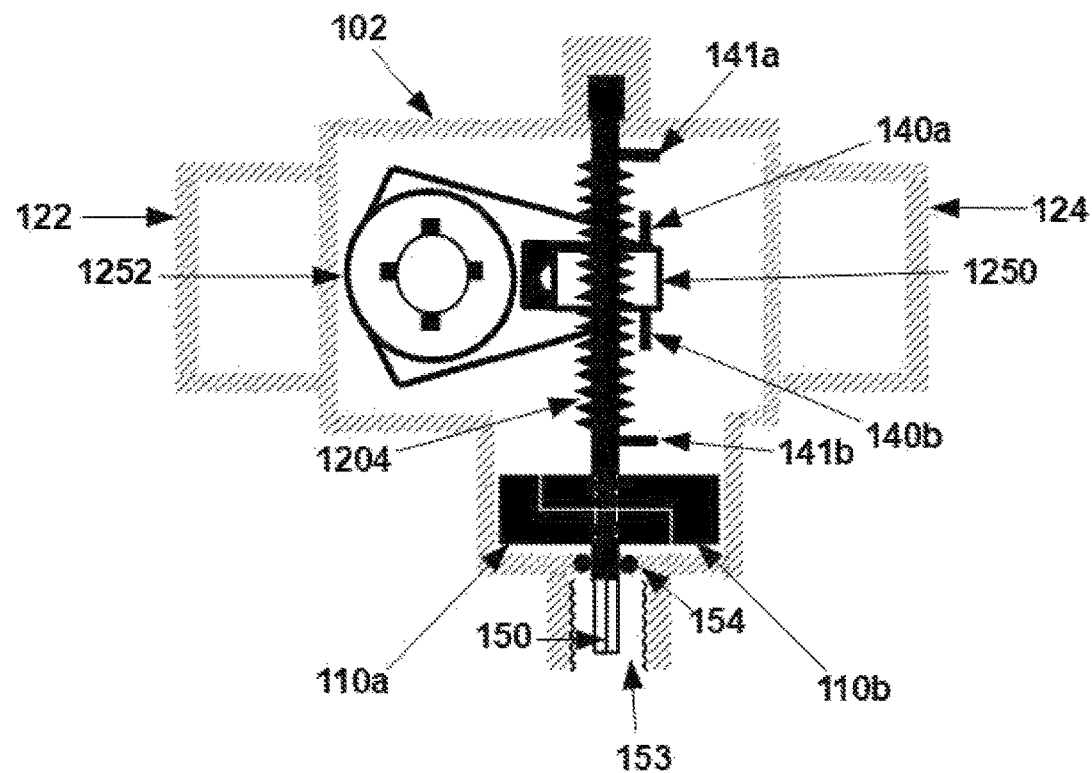
FIG. 20 depicts an assembled cut-away view as seen from the top of the valve (along the axis of rotation of the valve element) of the ferromagnetic magnet-actuated ball valve of FIGS. 18-19, including an internal traveling nut mechanism, with the external magnetic actuator and cheater port plug removed, showing an open access port for a cheater handle, in accordance with various aspects of the present disclosure.

FIG. 20 depicts an assembled cut-away view as seen from the top of the valve (along the axis of rotation of the valve element) of the ferromagnetic magnet-actuated ball valve of FIGS. 18-19, including an internal traveling nut mechanism, with the external actuator 130 and plug 152 removed, showing an open access port 153 for a cheater handle, in accordance with various aspects of the present disclosure. In FIG. 20 the plug 152 has been removed from port 153 to expose shaft 150. In various examples, a cheater handle may be coupled to shaft 150 in order to actuate the valve mechanically using the cheater handle, as described in further detail below. With plug 152 removed, seal 154 prevents fluid or gas from escaping from the valve around shaft 150 and through the open port 153. Those components in FIG. 20 that have been described previously with reference to FIGS. 1-19 may not be described again for purposes of clarity and brevity.

Figure 21:
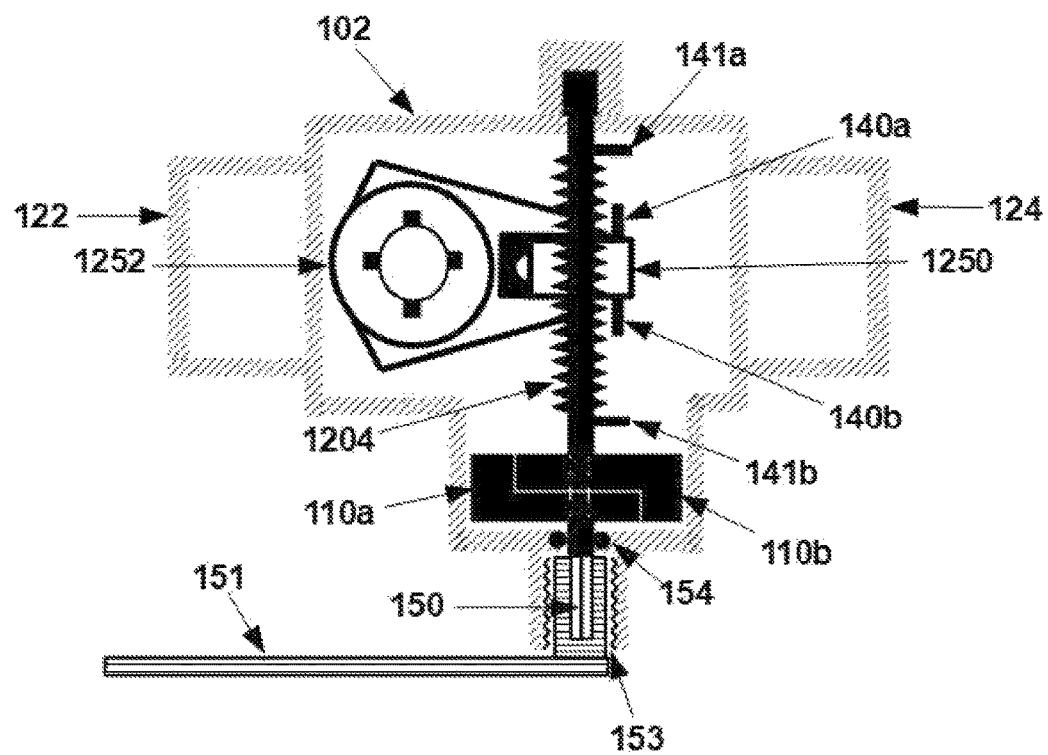
FIG. 21 depicts an assembled cut-away view as seen from the top of the valve (along the axis of rotation of the valve element) of the ferromagnetic magnet-actuated ball valve of FIGS. 18-20, including an internal traveling nut mechanism, with a cheater handle in the access port, with the external magnetic actuator and cheater port plug removed, in accordance with various aspects of the present disclosure.

FIG. 21 depicts an assembled cut-away view as seen from the top of the valve (along the axis of rotation of the valve element) of the ferromagnetic magnet-actuated ball valve of FIGS. 18-20, including an internal traveling nut mechanism, with a cheater handle 151 in the access port 153, with the external actuator 130 and plug 152 removed, in accordance with various aspects of the present disclosure. In FIG. 21, cheater handle 151 is coupled to (e.g., mechanically mated to) shaft 150. Seal 154 prevents fluid or gas from escaping from the valve around shaft 150 and out port 153. Shaft 150 may be mechanically coupled to stem 104. Accordingly, rotation of shaft 150 (e.g., via cheater handle 151) may rotate stem 104 and may actuate the valve between the open and closed positions. The lever portion of cheater handle 151 may allow for greater torque to be applied to shaft 150 and thereby to stem 104 relative to magnetic actuation via external actuator 130. Accordingly, cheater handle 151 may be used to "over-torque" the valve in order to "unstick" the valve if the valve has become stuck in a particular position (e.g., open, closed, or an intermediate position). Those components in FIG. 21 that have been described previously with reference to FIGS. 1-20 may not be described again for purposes of clarity and brevity.

In some embodiments of this invention, the enclosed backup seal (e.g., seal 154 of FIG. 1) may comprise traditional gland packing and/or a traditional shaft seal such as those used on a traditional mechanical valve. Furthermore, the magnetic actuator mechanism (e.g., external magnets 106a, 106b of external actuator 130 and internal actuation member 110) and sealed valve bonnet may fit over the legacy valve bonnet and shaft seal, and may be removed again in event that the valve becomes stuck. In such examples, a cheater handle that is effective to be employed with the traditional mechanical valve may be attached to the legacy valve design after removal of the retrofit magnetic actuator bonnet. FIGS. 22-31 illustrate this principle.

Furthermore, the concept of using the legacy valve bonnet and gland seal as the backup enclosure when employing a cheater handle (or alternatively using all or a portion of the magnetic actuation mechanism or the external aspects of the magnetic actuation mechanism as an access port for a cheater handle) enables a retro-fit kit type model of adding a magnetic actuation mechanism to a traditional mechanically-actuated valve, and may be beneficial and useful even in instances where cheater handles are not employed or permitted.

Figure 22:
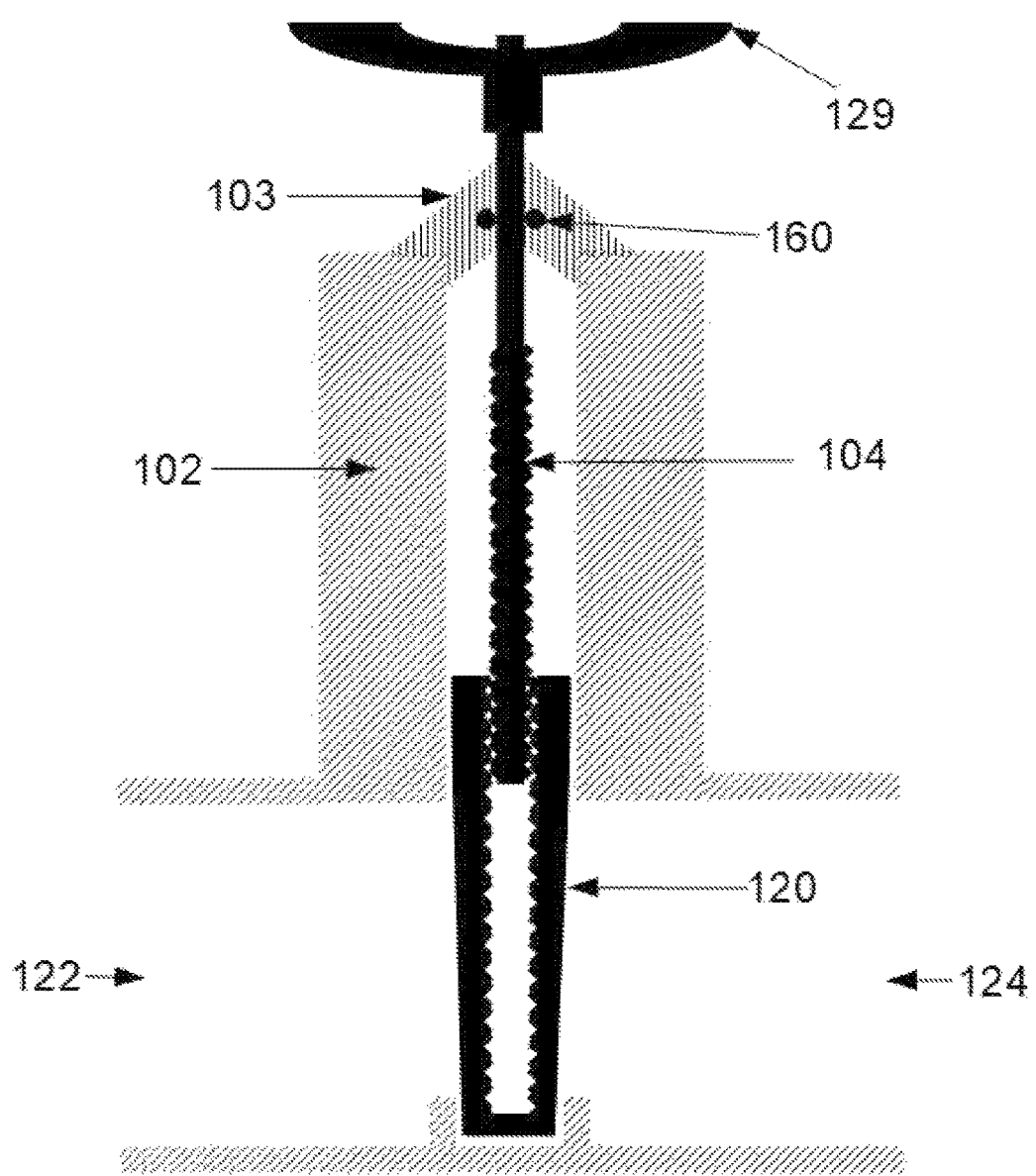
FIG. 22 depicts an assembled side cut-away view of a traditional mechanically-actuated gate valve in the closed position, prior to modification for magnetic actuation or use of an elongated cheater handle, in accordance with various aspects of the present disclosure.

FIG. 22 depicts an assembled side cut-away view of a traditional mechanically-actuated gate valve in the closed position. In the gate valve depicted in FIG. 22, a mechanical handle component 129 is used to actuate the valve. Turning handle component 129 is operable to turn stem 104 to open and close the valve. The gate valve depicted in FIG. 22 uses a seal 160 (e.g., a gland packing), providing a dynamic seal between valve stem 104 and the legacy valve bonnet 103, prior to modification for magnetic actuation or use of an elongated cheater handle, in accordance with various aspects of the present disclosure. Those components in FIG. 22 that have been described previously with reference to FIGS. 1-21 may not be described again for purposes of clarity and brevity.

Figure 23:
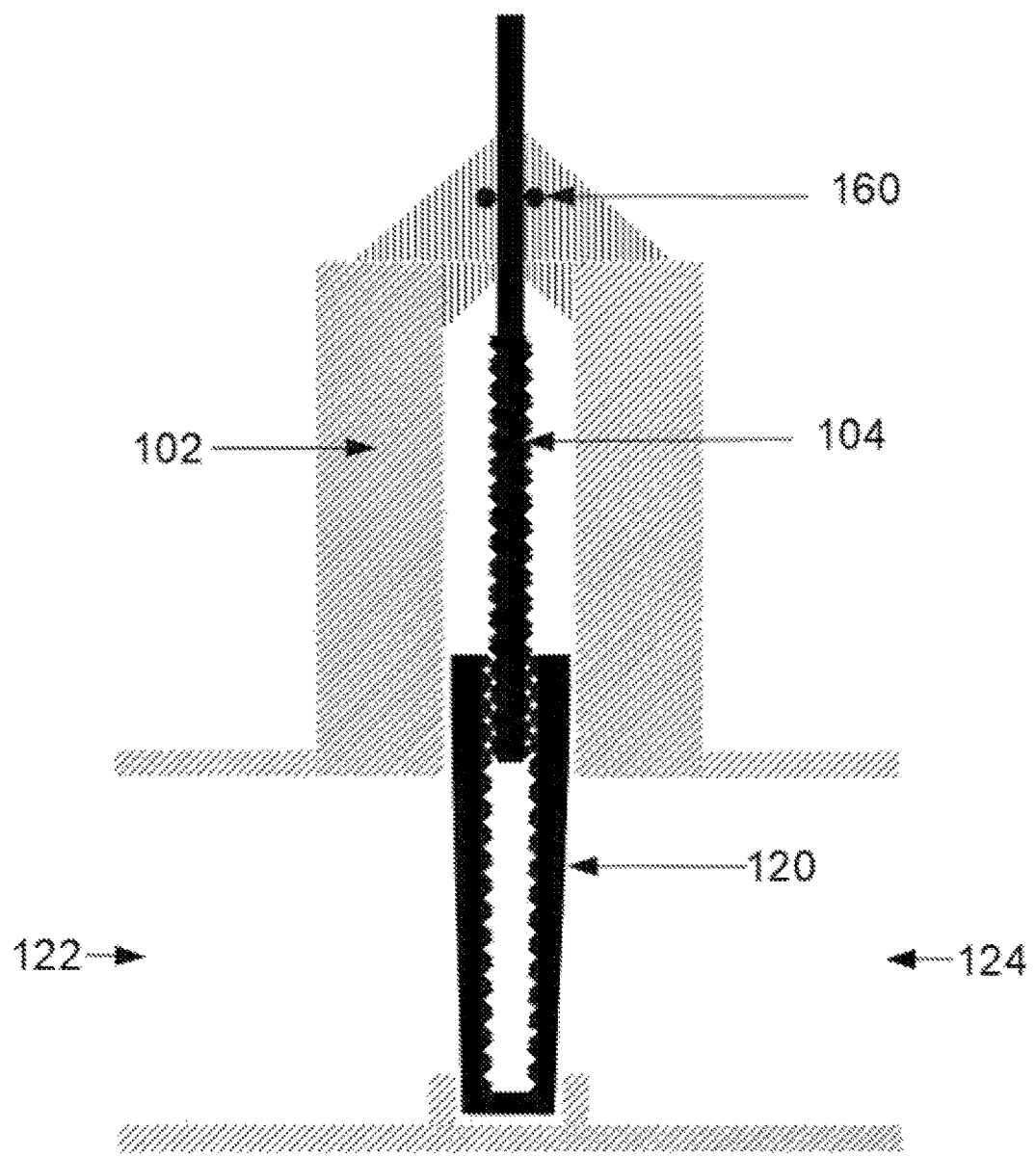
FIG. 23 depicts an assembled side cut-away view of the valve depicted in FIG. 22 with the mechanical handle removed, in preparation for being converted to magnetic actuation via a conversion kit, in accordance with various aspects of the present disclosure.

FIG. 23 depicts an assembled side cut-away view of the valve depicted in FIG. 22 with the mechanical handle component 129 removed, in preparation for being converted to magnetic actuation, in accordance with various aspects of the present disclosure. Those components in FIG. 23 that have been described previously with reference to FIGS. 1-22 may not be described again for purposes of clarity and brevity.

Figure 24:
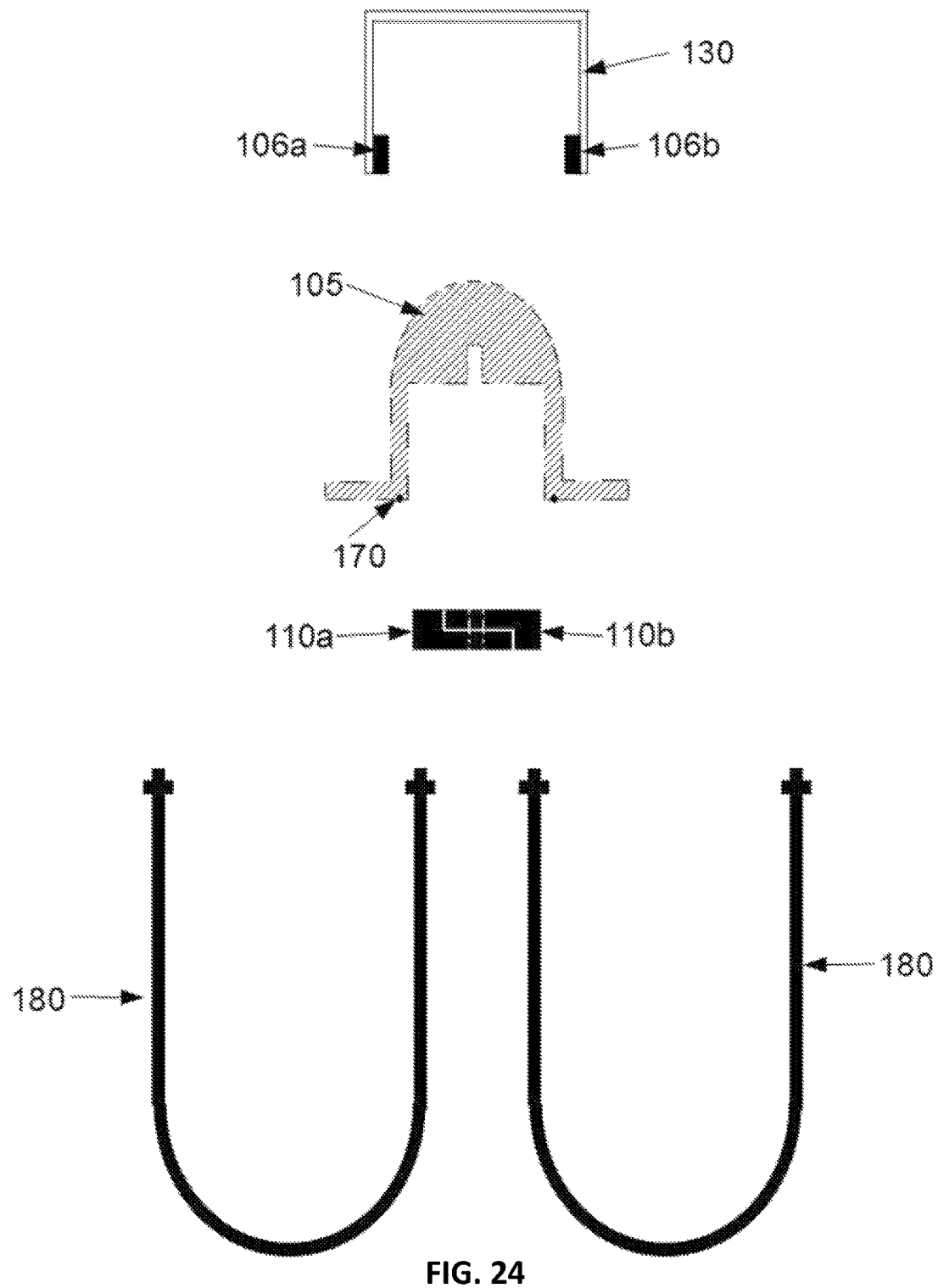
FIG. 24 depicts a disassembled cut-away view of a conversion kit effective to add magnetic actuation to seal a valve, in accordance with various aspects of the present disclosure.

FIG. 24 depicts a disassembled cut-away view of a conversion kit (e.g., a retrofit kit) that may be used to add magnetic actuation to seal a standard valve, in accordance with various aspects of the present disclosure. External actuator 130 comprising external magnets 106a and/or 106b comprise the external portions of the magnetic actuation mechanism described above. Bonnet component 105 is a second bonnet that would typically have low magnetic susceptibility/permeability. Seal component 170 is a static seal either attached to component 105 by an adhesive, embedded in a groove, and/or simply placed between bonnet component 105 and valve bonnet 103 in order to seal bonnet component 105 to the bonnet of the traditional valve. In some embodiments, the legacy valve body 102 or its bonnet may have to be smoothed, sanded, and/or machined to better prevent leaks around this seal. In some embodiments shown in later figures, such as FIGS. 32 and 34, it may be most advantageous to place seal component 170 closer to the valve stem/gland nut such that the area that seal component 170 is affixed to is smaller and the physical forces from any internal pressure are lowered due to the area that the pressure acts being smaller. Internal actuation member 110 (including internal actuator components 110a, 110b) are sealed inside an interior of bonnet component 105 by Seal 170. Internal actuator components 110a and 110b, or in some embodiments, a single internal actuation member 110 are the internal portion(s) of the magnetic actuator, as previously described. Attachment component(s) 180 are attachment features such as U-Bolts used to hold the magnetic actuation kit to the legacy valve body or bonnet as depicted below in FIGS. 25, 26. Those components in FIG. 24 that have been described previously with reference to FIGS. 1-23 may not be described again for purposes of clarity and brevity.

Figure 25:
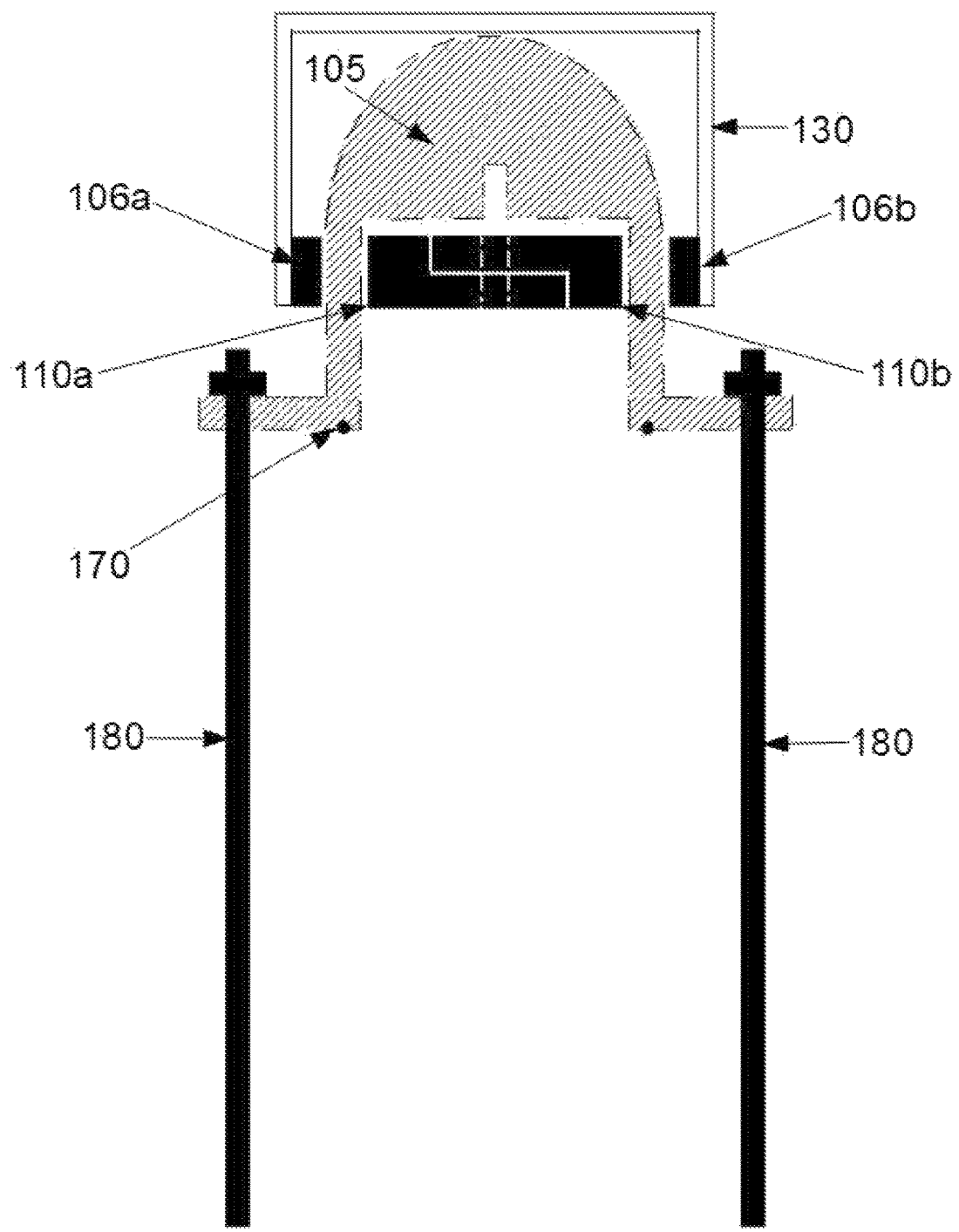
FIG. 25 depicts an assembled cut-away view of a conversion kit effective to add magnetic actuation to seal a valve, in accordance with various aspects of the present disclosure.

FIG. 25 depicts an assembled cut-away view of a conversion kit that is used to add magnetic actuation to seal a standard valve, in accordance with various aspects of the present disclosure. Those components in FIG. 25 that have been described previously with reference to FIGS. 1-24 may not be described again for purposes of clarity and brevity. FIG. 25 depicts an assembled example of the components described above in reference to FIG. 24. The assembly depicted in FIG. 25 may be retrofit onto a legacy valve (e.g., as depicted in FIG. 26) in order to impart magnetic actuation to a traditional mechanically-actuated valve.

Figure 26:
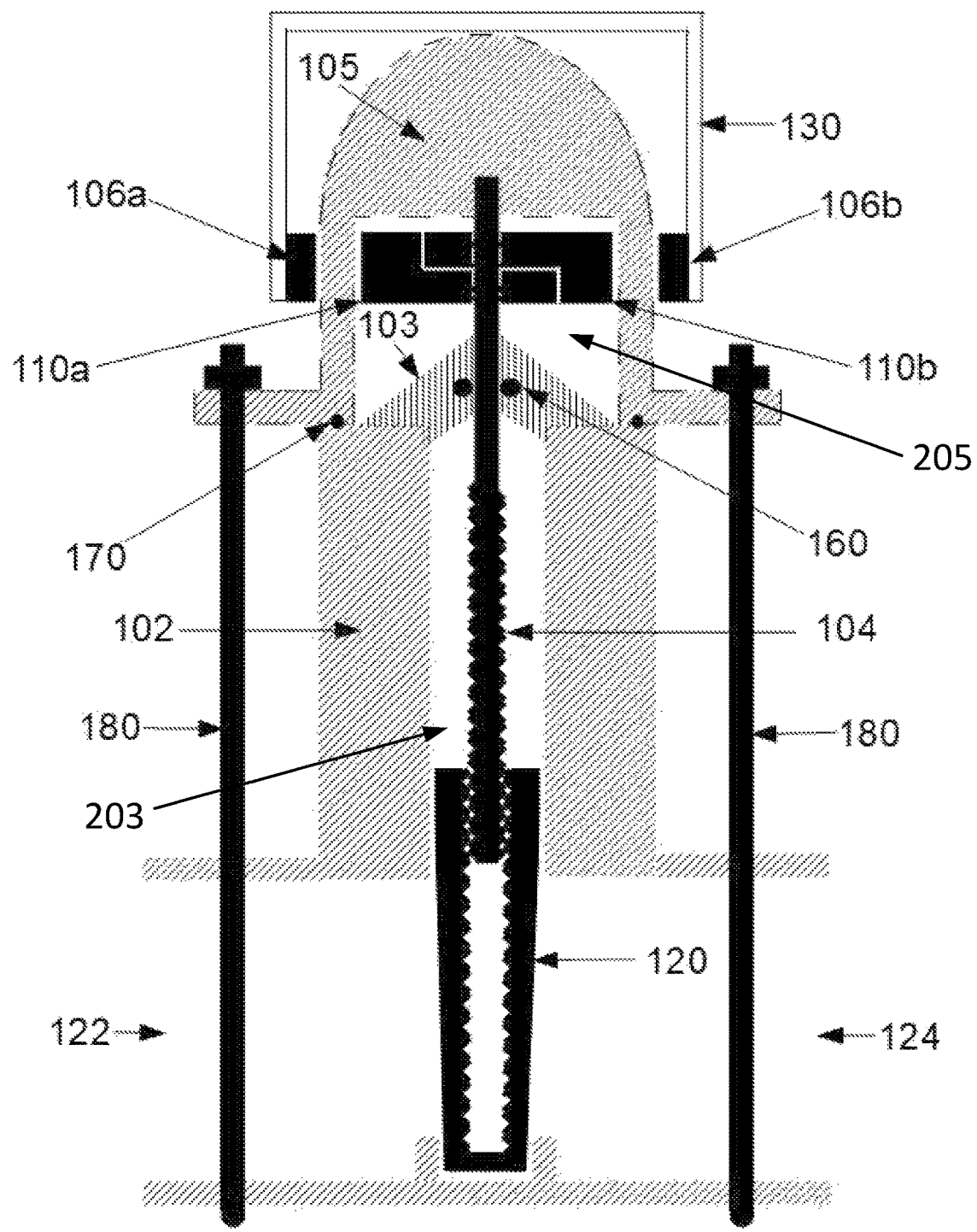
FIG. 26 depicts an assembled side cut-away view of a ferromagnetic magnet-actuated gate valve in the closed position, with the mechanical handle removed, and the magnetic actuation conversion kit of FIGS. 24 and 25 installed, in accordance with various aspects of the present disclosure.

FIG. 26 depicts an assembled side cut-away view of a ferromagnetic magnet-actuated gate valve in the closed position, based on the valve depicted in FIG. 22 with the mechanical handle removed, and the magnetic actuation conversion kit shown in FIG. 24-25 installed, in accordance with various aspects of the present disclosure.

Attachment components 180 (e.g., U-Bolts or other appropriate fasteners) secure the magnetic actuator's bonnet component 105 onto valve body 102 or legacy valve bonnet 103 firmly enough to compress seal component 170, thereby preventing any leakage to the exterior of the valve, even in the event that shaft seal 160 leaks or fails. In various examples, bonnet component 105 may be sealed onto valve body 102 or legacy valve bonnet 103 using seal component 170 up to the full rated pressure of the valve. By sealing stem 104 and shaft seal 160 (e.g., a stem seal, gasket, and/or gland packing) completely within the conversion kit's bonnet component 105, any leaks of fluid or gas that make it past shaft seal 160 are contained by bonnet component 105 and seal component 170 preventing those leaks that make it past shaft seal 160 from emerging to the outer environment. However, in the event that the valve becomes stuck, all or part of the magnetic actuation conversion kit may be removed in order to install a mechanical cheater handle (not shown in FIG. 26). In various examples, when bonnet component 105 is sealed onto legacy valve bonnet 103 (or valve body 102), valve bonnet 105 may itself be considered the port to the second enclosure 205. Similarly, valve bonnet 105 may be considered the plug that seals off the second enclosure 205. In the example depicted in FIG. 26, second enclosure 205 may be defined by bonnet component 105 sealed onto legacy valve bonnet 103 (and/or valve body 102) via seal component 170.

Internal actuation member 110 (and/or internal actuation components 110*a*, 110*b*) may be operatively coupled to the stem 104 in any suitable manner. In various examples, bonnet component 105 may have low magnetic susceptibility, allowing this conversion kit to be employed even with iron, carbon steel, and/or other magnetically-permeable valve bodies that may otherwise preclude the use of a magnetic actuation mechanism. Those components in FIG. 26 that have been described previously with reference to FIGS. 1-25 may not be described again for purposes of clarity and brevity.

Figure 27:
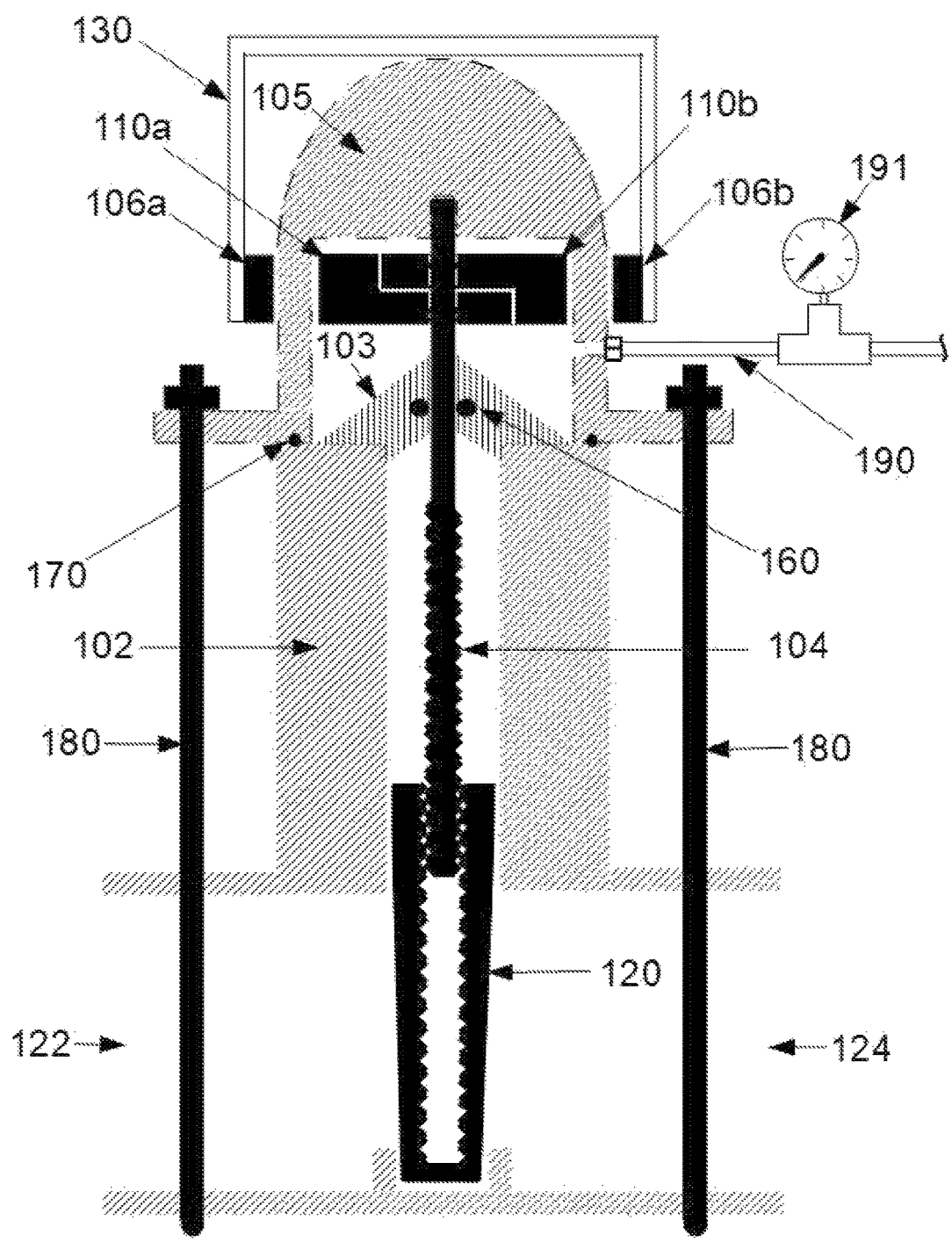
FIG. 27 depicts an assembled side cut-away view of a ferromagnetic magnet-actuated gate valve in the closed position, with the mechanical handle removed, and the magnetic actuation conversion kit of FIGS. 24 and 25 installed, including a bleed line and pressure gauge, in accordance with various aspects of the present disclosure.

FIG. 27 depicts an assembled side cut-away view of a ferromagnetic magnet-actuated gate valve in the closed position, based on the valve depicted in FIGS. 22-23 and FIG. 26 with the mechanical handle component 129 removed, and the magnetic actuation conversion kit pictured in FIG. 24 and FIG. 25 installed, and a bleed line component 190 and a pressure gauge component 191 installed. Seal component 170 may allow access to a portion the original mechanical shaft that is sealed with the valve's original shaft seal 160, which now serves as a backup seal when a cheater handle is in use, in accordance with various aspects of the present disclosure. In this embodiment, the interstitial pressure in the volume enclosed between bonnet component 105 and legacy valve bonnet 103 and sealed by seal component 170 can be monitored with gauge component 191 and controlled with bleed line component 190, such as those used on block and bleed valves. Furthermore, this optional bleed line could be employed to reduce the interstitial pressure prior to removing/opening bonnet component 105 (e.g., to install a cheater handle, perform maintenance, or for any other reason). Accordingly, the embodiment depicted and described in reference to FIG. 27 offers increased flexibility and safety features for certain applications. Those components in FIG. 27 that have been described previously with reference to FIGS. 1-26 may not be described again for purposes of clarity and brevity.

Figure 28:
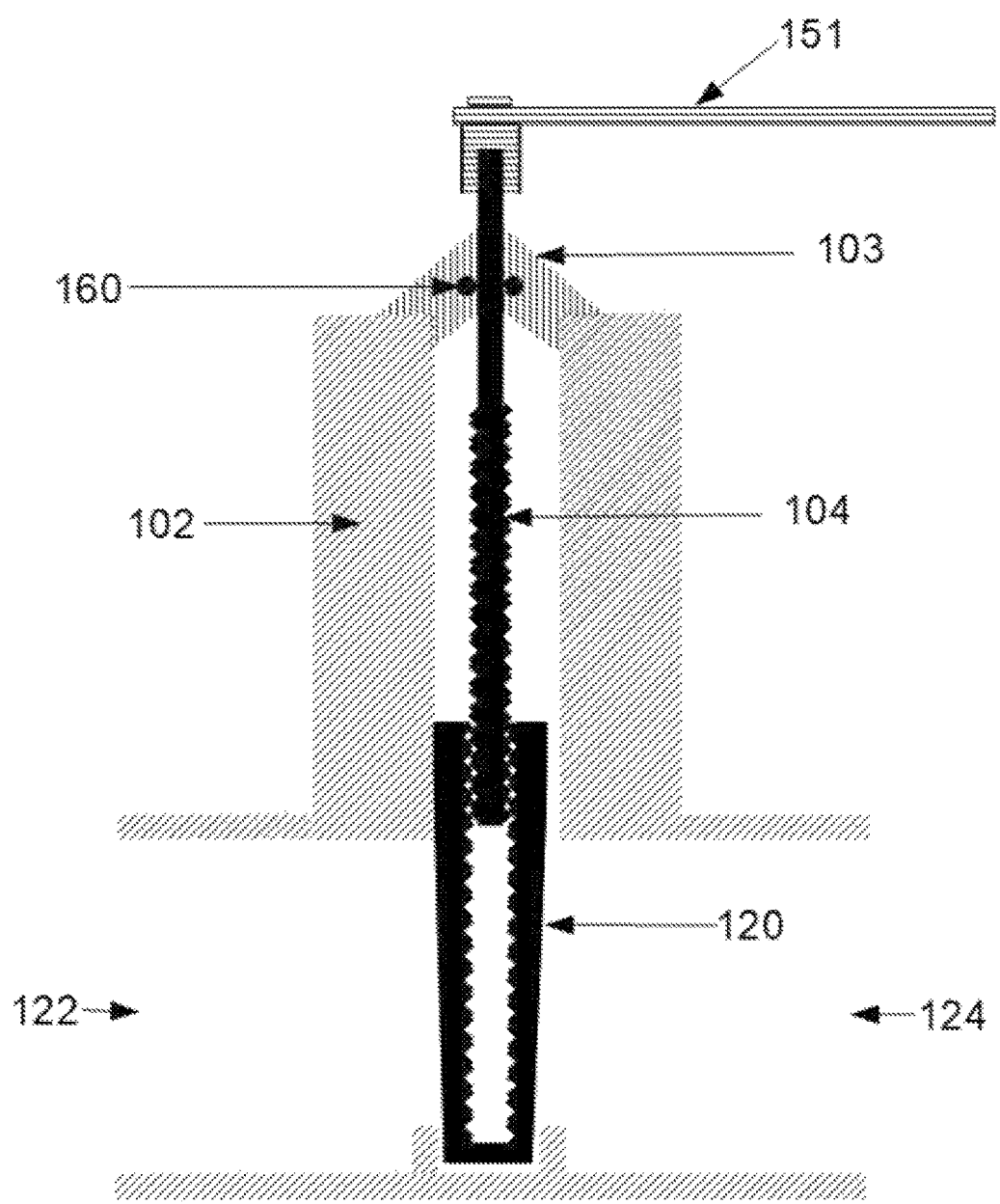
FIG. 28 depicts an assembled side cut-away view of the valve depicted in FIGS. 22, 23, 26, and 27 with the magnetic actuation kit removed and the valve sealed against leakage by the original shaft seal, with a mechanical cheater handle in place, in accordance with various aspects of the present disclosure.
Figure 29:
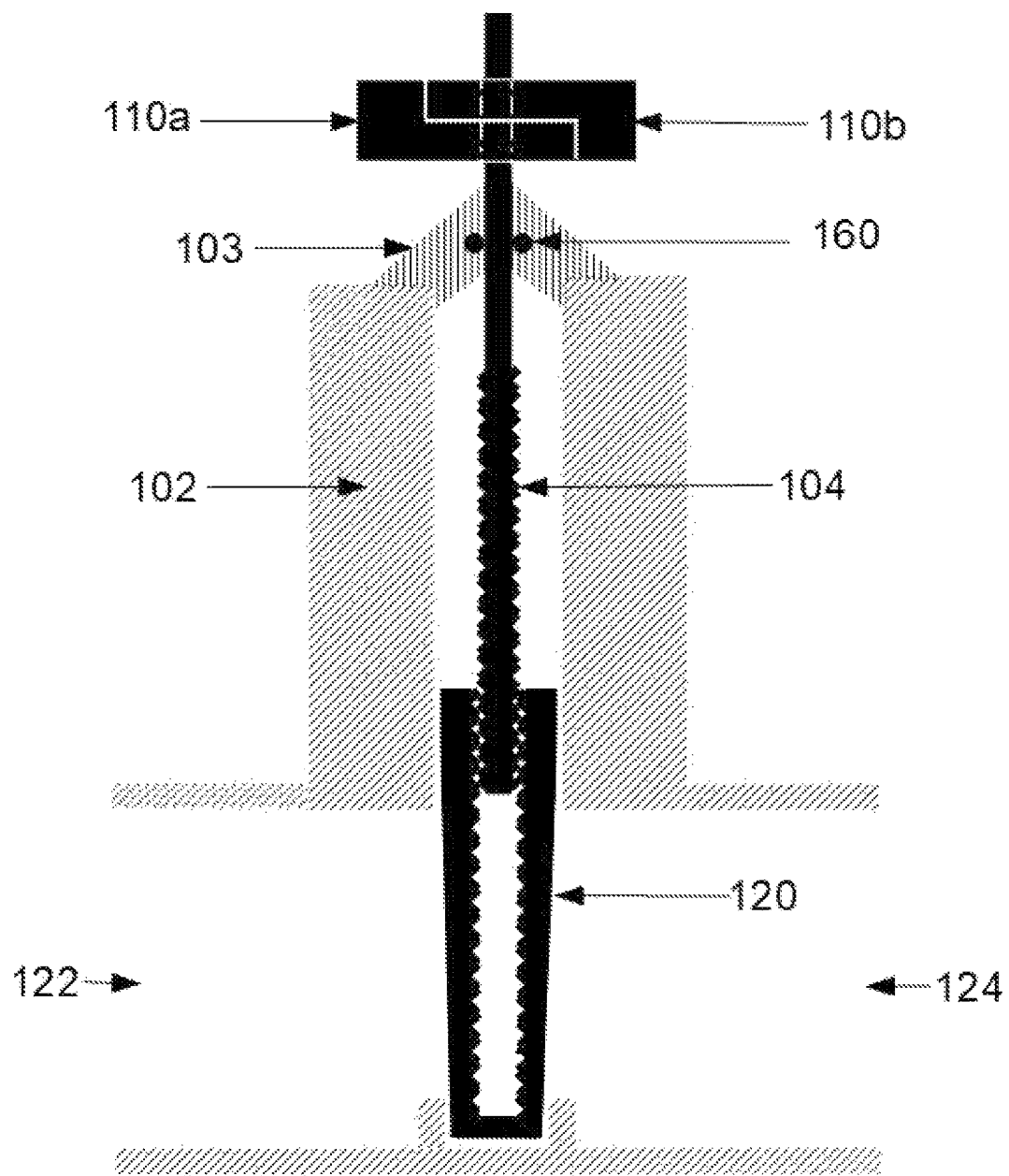
FIG. 29 depicts an assembled side cut-away view of the valve depicted in FIGS. 22, 23, 26, and 27 with both the external magnetic actuator and the bonnet of the magnetic actuation coupling removed, but with the internal actuation mechanism left in place, in accordance with various aspects of the present disclosure.
Figure 30:
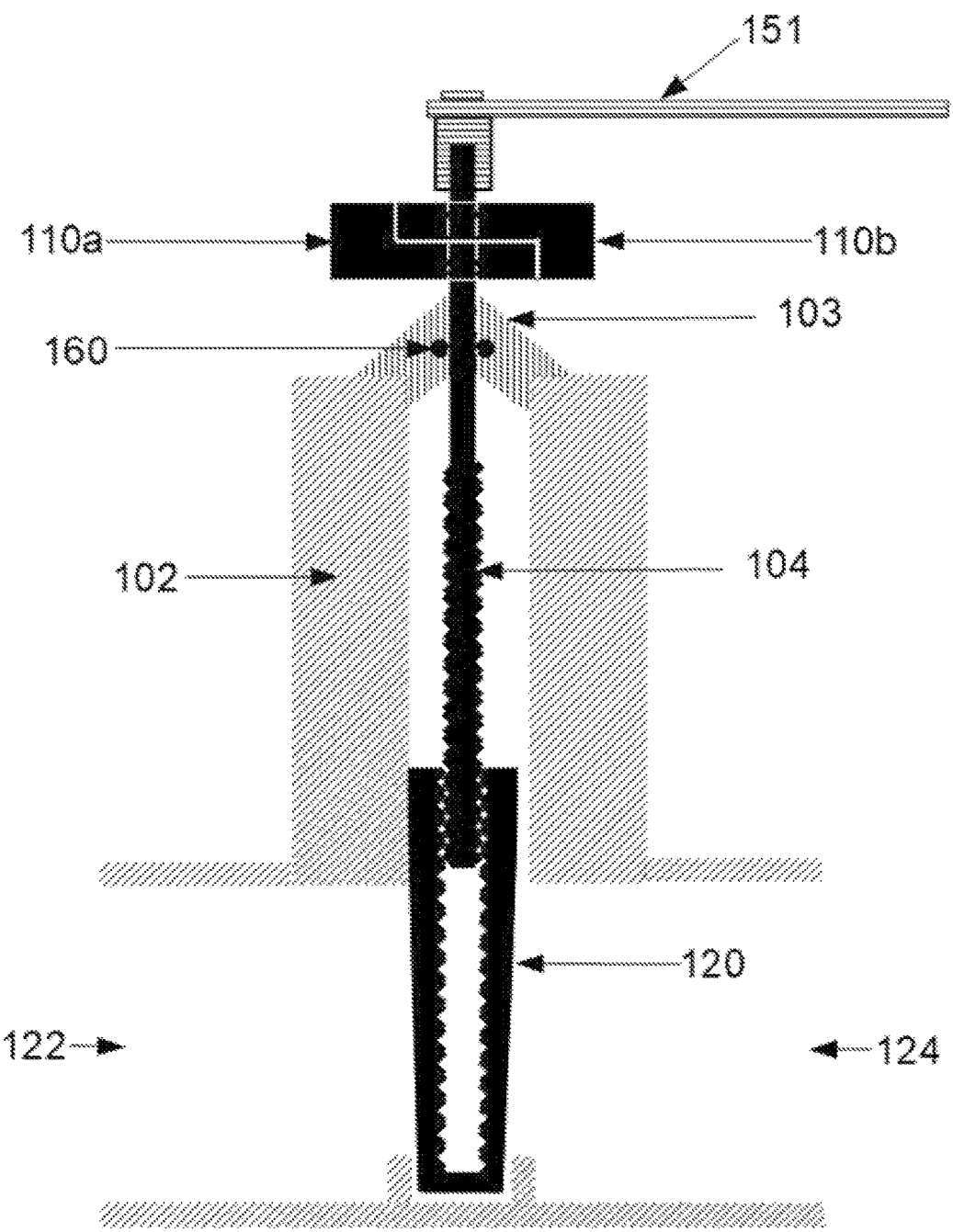
FIG. 30 depicts an assembled side cut-away view of the valve depicted in FIGS. 22, 23, 26, 27, and 29 with the external magnetic actuator and the bonnet of the magnetic actuation coupling removed, with a mechanical cheater handle in place, in accordance with various aspects of the present disclosure.

FIG. 28 depicts an assembled side cut-away view of the valve depicted in FIGS. 22-23 and FIGS. 26-27 with the entire magnetic actuation conversion kit removed and the valve sealed against leakage by the shaft seal 160. As depicted in FIG. 28, the magnetic actuation conversion kit may be removed in order to employ a cheater handle 151 (e.g., to "unstick" a stuck valve). Alternatively, in some other embodiments of the invention, the internal magnetic actuator comprised of internal actuator components 110*a*, 110*b* might be left in place while the cheater handle is used as depicted in FIG. 29 and FIG. 30. Those components in FIG. 28 that have been described previously with reference to FIGS. 1-27 may not be described again for purposes of clarity and brevity.

FIG. 29 depicts an assembled side cut-away view of the valve depicted in both FIGS. 22-23 and FIGS. 26-27 with both the external actuator 130 and the bonnet component 105 of the magnetic actuation conversion kit removed, but with the internal actuation components 110*a* and 110*b* left in place. In embodiments where a single internal actuation member 110 is used, the single internal actuation member 110 may be left in place. As shown, the valve remains sealed against leakage by the shaft seal 160. In various examples, a mechanical cheater handle may be employed, as depicted in FIG. 30. Those components in FIG. 29 that have been described previously with reference to FIGS. 1-28 may not be described again for purposes of clarity and brevity.

FIG. 30 depicts an assembled side cut-away view of the valve depicted in FIGS. 22-23, FIGS. 26-27, and FIG. 29 with both the external actuator 130 and the bonnet component 105 of the magnetic actuation conversion kit removed, but with the internal actuation components 110*a* and 110*b* left in place. As shown, the valve remains sealed against leakage by the shaft seal 160. In FIG. 30 a cheater handle 151 is coupled to the exposed portion of the shaft (e.g., the exposed portion of stem 104). Those components in FIG. 30 that have been described previously with reference to FIGS. 1-29 may not be described again for purposes of clarity and brevity.

Figure 31:
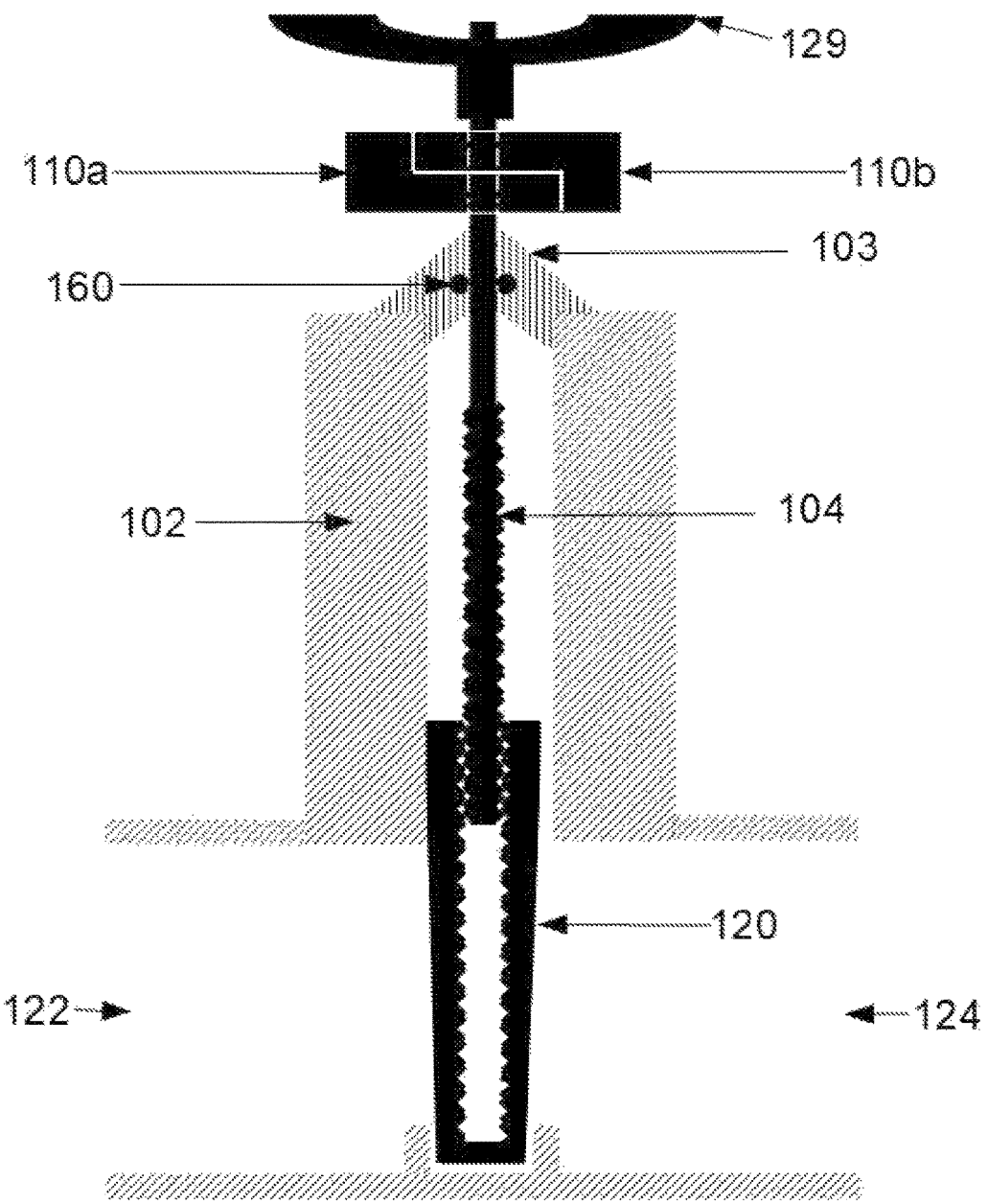
FIG. 31 depicts an assembled side cut-away view of the valve depicted in FIGS. 22, 23, 26, 27, and 29 with the external magnetic actuator and the bonnet of the magnetic actuation coupling removed, with the original mechanical valve handle in place, in accordance with various aspects of the present disclosure.

FIG. 31 depicts an assembled side cut-away view of the valve depicted in FIGS. 22-23, FIG. 26, and FIG. 28 with both the external actuator 130 and the bonnet component 105 of the magnetic actuation conversion kit removed, but with the internal actuation components 110*a* and 110*b* left in place. As shown, the valve remains sealed against leakage by the shaft seal 160. In FIG. 31, the original handle component 129 has been reinstalled, and may used as a mechanical failsafe handle or light duty cheater handle, in accordance with various aspects of the present disclosure. Those components in FIG. 31 that have been described previously with reference to FIGS. 1-30 may not be described again for purposes of clarity and brevity.

Figure 32:
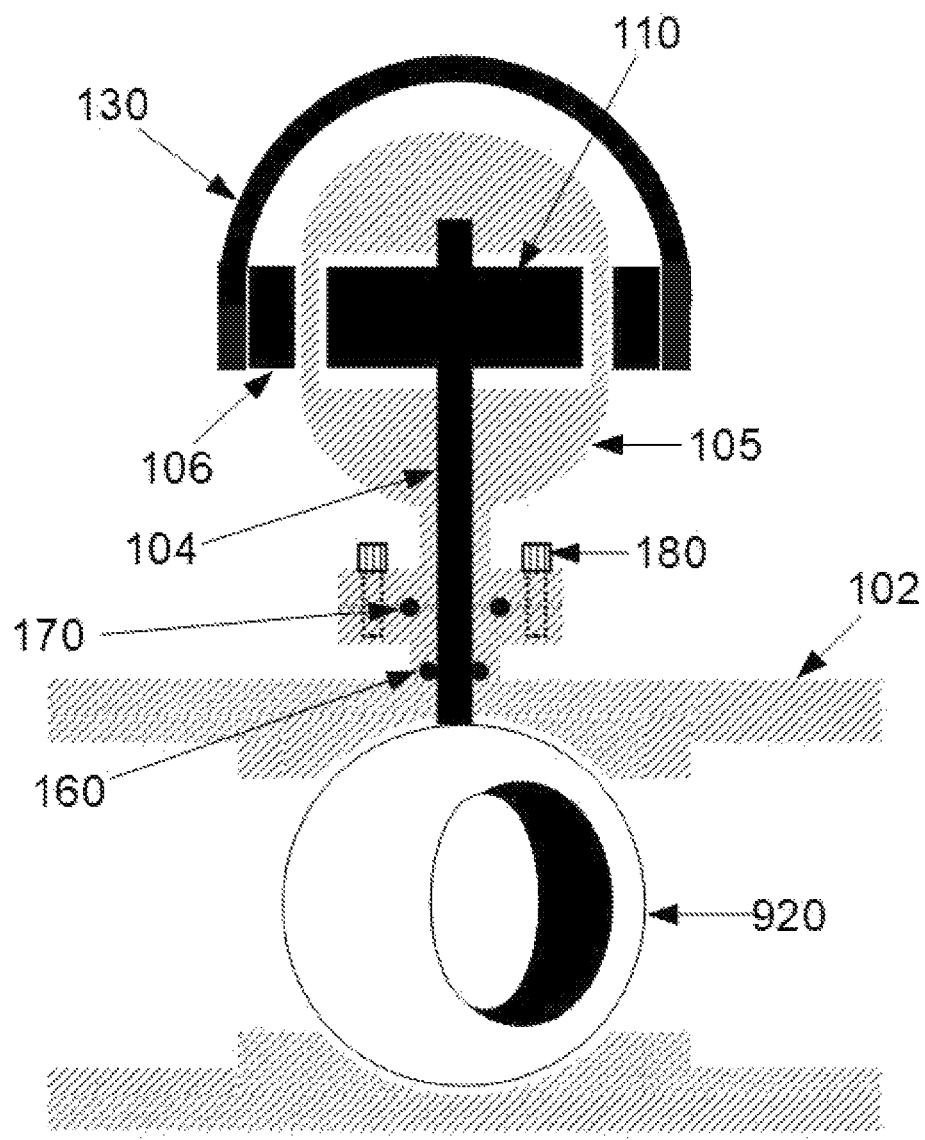
FIG. 32 depicts an assembled side cut-away view of a ferromagnetic magnet-actuated ball valve in a partially open position, with the mechanical handle removed, and a magnetic actuation conversion kit installed, in accordance with various aspects of the present disclosure.

FIG. 32 depicts an assembled side cut-away view of a ferromagnetic magnet-actuated ball valve in a partially open position, with the mechanical handle removed, and a magnetic actuation conversion kit appropriate for ball valves installed. A seal component 170 allows access to a portion the original mechanical stem 104 that is sealed by the valve's shaft seal 160, which now serves as a backup seal when the cheater handle not yet installed is in use, in accordance with various aspects of the present disclosure.

Attachment components 180 such as Bolts, U-Bolts, and/or machine screws secures the magnetic actuator's bonnet component 105 to valve body 102 enough to compress seal component 170, thereby preventing any leaks that make it past shaft seal 160 up to the full rated pressure of the valve. In some embodiments, this pressure may be monitored directly with a gauge or remotely with a small bleed line, such as those used on block and bleed type valves, similar to the embodiment shown in FIG. 27. Furthermore, this optional bleed line could be employed to control the pressure and reduce it prior to opening bonnet component 105 (e.g., to install a cheater handle or to perform valve maintenance). Accordingly, the embodiment depicted in FIG. 32 may offer increased flexibility and better safety features for certain applications.

By sealing stem 104 and shaft seal 160 (e.g., a stem seal, gasket, and/or gland packing) completely within the conversion kit's bonnet component 105, any leaks of fluid or gas that make it past shaft seal 160 are contained by bonnet component 105 and seal component 170 preventing those leaks that make it past shaft seal 160 from emerging to the outer environment. However, in the event that the valve becomes stuck, all or part of the magnetic actuation conversion kit may be removed in order to install a mechanical cheater handle.

Internal actuation member 110 (and/or internal actuation components 110a, 110b) may be operatively coupled to the stem 104 in any suitable manner. In various examples, bonnet component 105 may have low magnetic susceptibility, allowing this conversion kit to be employed even with iron, carbon steel, and/or other magnetically-permeable valve bodies that may otherwise preclude the use of a magnetic actuation mechanism. Attachment components 180 such as bolts, U-Bolts, and/or machine screws secure bonnet component 105 to valve body 102 or to legacy valve bonnet 103. Those components in FIG. 32 that have been described previously with reference to FIGS. 1-31 may not be described again for purposes of clarity and brevity.

Figure 33:
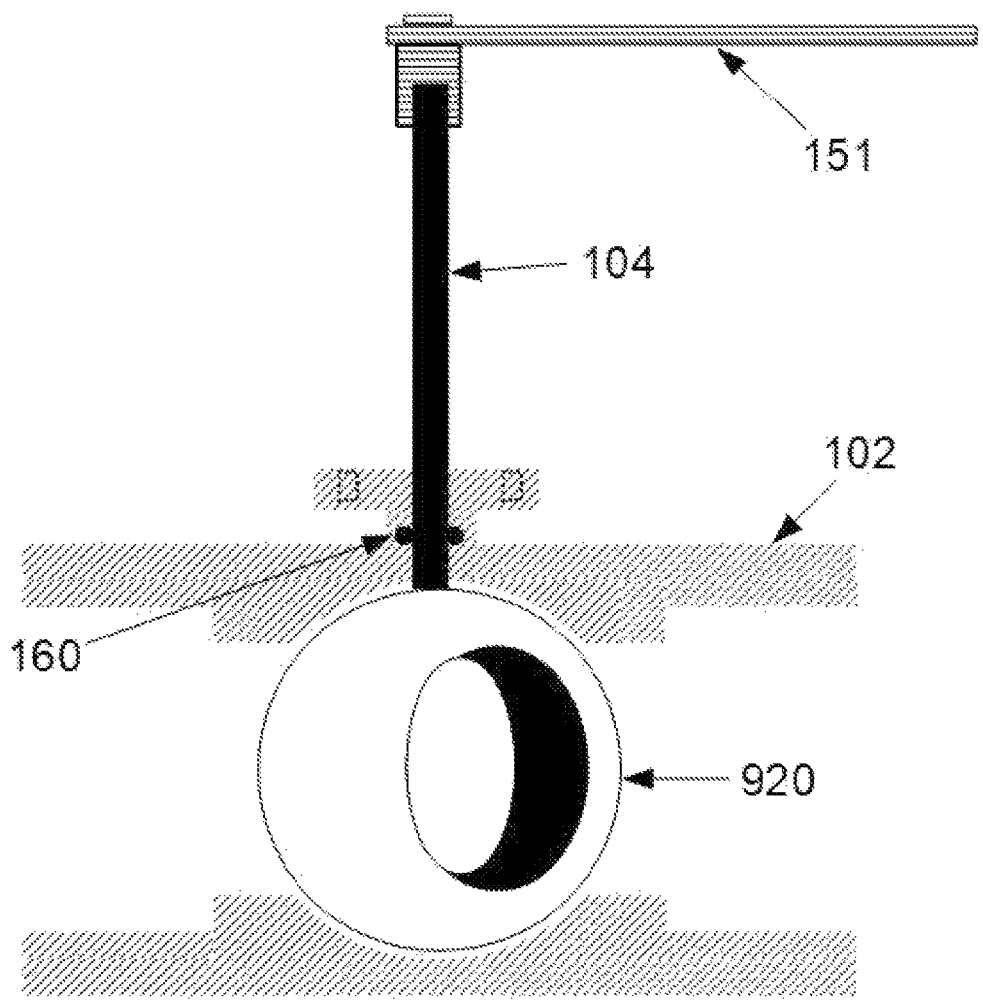
FIG. 33 depicts an assembled side cut-away view of the ball valve of FIG. 32 in a partially open position, with the magnetic actuation conversion kit removed and a cheater handle installed, in accordance with various aspects of the present disclosure.

FIG. 33 depicts an assembled side cut-away view of the ball valve of FIG. 32 in a partially open position, with the magnetic actuation conversion kit removed and a cheater handle 151 installed. The valve's shaft seal 160, may now serves as a backup seal while the cheater handle is in use, in accordance with various aspects of the present disclosure. Those components in FIG. 33 that have been described previously with reference to FIGS. 1-32 may not be described again for purposes of clarity and brevity.

Figure 34:
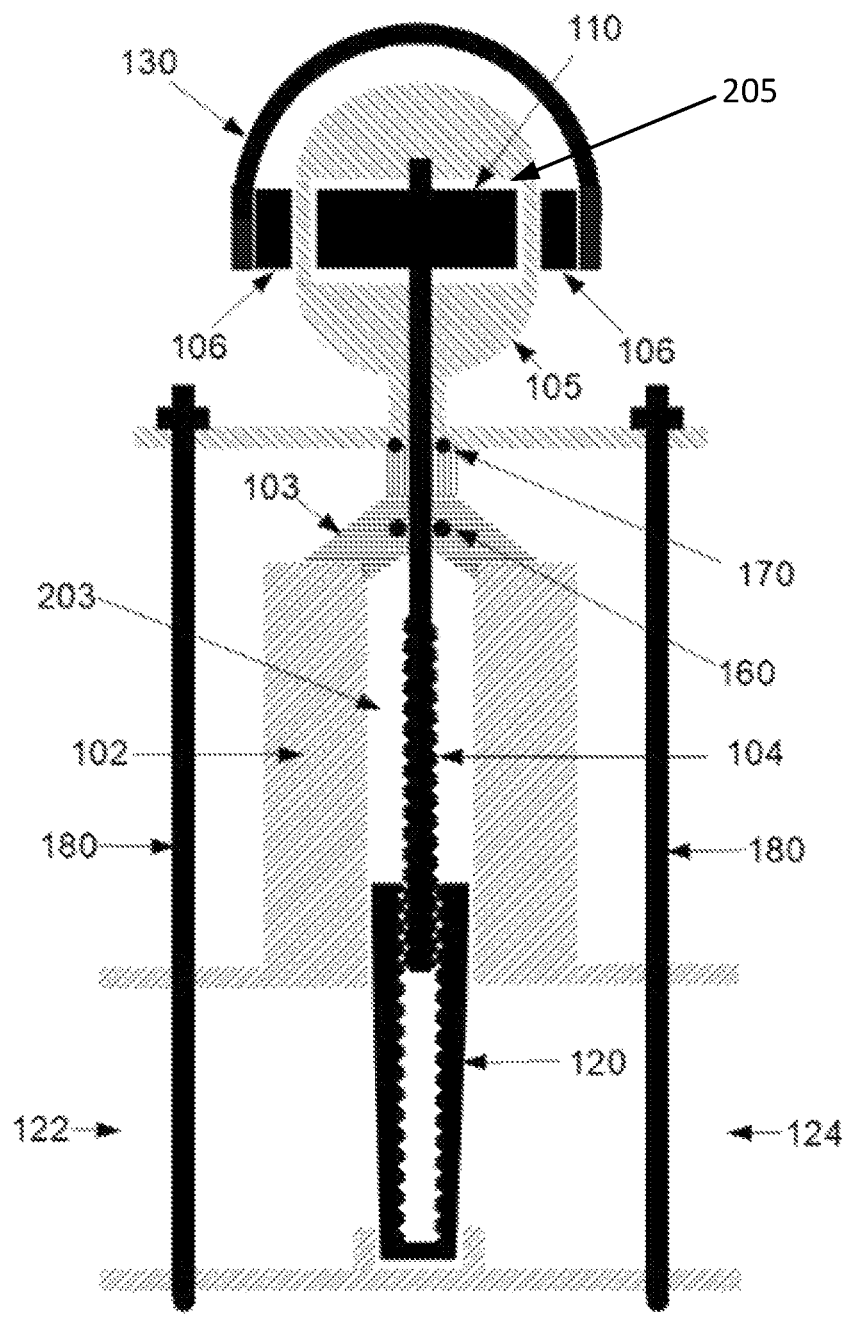
FIG. 34 depicts an assembled side cut-away view of a gate valve, with a magnetic actuation conversion kit that seals on or around or near the legacy gland seal nut in accordance with various aspects of the present disclosure.

FIG. 34 depicts an assembled side cut-away view of a gate valve, with a magnetic actuation conversion kit that seals on, around, and/or near the legacy gland seal nut, and/or closer to the shaft on legacy valve bonnet 103. Such an embodiment may be advantageous in various applications (e.g., depending on the shape of valve bonnet and/or the installation of the valve) or if the application is relatively high pressure, as a smaller interface area may be better for structural integrity as the area that the seal component 170 affixes to may be smaller, and the physical forces from any internal pressure are lowered because the area that the pressure acts on is smaller. Those components in FIG. 34 that have been described previously with reference to FIGS. 1-33 may not be described again for purposes of clarity and brevity.

Various devices and techniques related to magnetically-actuated valves are generally described. In some examples, magnetically-actuated valves may include mechanisms to provide access for a mechanical linkage in the event that the magnetic coupling is unable to break loose a stuck valve.

Advantages of this approach include that the torque is limited during normal operation so as not to damage the valve by overtightening for example, the cost is lower by not having to build the magnetic coupling to transmit extreme torque levels needed to overcome severe stuck valve conditions, and safety and reliability are improved by being able to address these severe conditions without removing the valve from service or compromising the pressure seal.

Among other potential benefits, magnetic valves constructed in accordance with embodiments of the present disclosure may alleviate the problem of requiring expensive, bulky and/or very high temperature magnets for conditions that would only occur quite rarely in practice. Additionally, as described herein, cheater handles may be employed to provide the increased torque sometimes necessary to break loose a stuck valve without requiring more powerful, larger, and more expensive magnets. Additionally, as described herein, the cheater handle may be employed without interruption of valve operability and while maintaining a seal between the interior and exterior of the valve body.

While the invention has been described in terms of particular embodiments and illustrative figures, those of ordinary skill in the art will recognize that the invention is not limited to the embodiments or figures described.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

Specific elements of any embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A valve assembly, comprising:
   a valve body defining a first cavity and a second cavity, the valve body comprising a first port into the first cavity, a second port into the first cavity, and a third port into the second cavity;
   a movable valve member positioned in the first cavity between the first port and the second port and configured to control fluid flow from the first port to the second port;
   an internal seal disposed in the valve body between the first cavity and the second cavity that prevents fluid flowing through the first port or the second port from reaching the second cavity;
   an internal mechanism with a first end and a second end, the first end disposed in the first cavity and operatively coupled to the movable valve member, the second end traversing the internal seal and positioned in the second cavity;
   a removable plug operable to seal off the third port and the second end of the internal mechanism from an external environment of the valve assembly when the removable plug is seated in the third port;
   an internal actuation member having a ferromagnetic portion comprising an impermanent or permanent magnet, the internal actuation member operatively coupled to at least a portion of the internal mechanism; and
   an external actuator operatively coupled to an exterior of the valve body, the external actuator comprising:
      a first magnetic pole section adjacent to the valve body; and
      a second magnetic pole section adjacent to the valve body; and
   wherein movement of the external actuator is effective to exert a first force on the internal mechanism, and wherein the internal mechanism is effective to transmit a second force to the movable valve member.

2. The valve assembly of claim 1, wherein the removable plug comprises a threaded plug sized and shaped so as to mate with a threaded interior surface of the third port.

3. The valve assembly of claim 1, wherein the removable plug comprises a knock out plug.

4. The valve assembly of claim 1, wherein the removable plug is welded, brazed, or soldered in place in the third port.

5. The valve assembly of claim 1, wherein the removable plug is held against an O-ring seal in the third port.

6. The valve assembly of claim 1, wherein the removable plug is sealed using a gasket in or around the third port.

7. The valve assembly of claim 1, wherein the removable plug is sealed using an adhesive or polymer.

8. The valve assembly of claim 1, wherein the second end of the internal mechanism is sized and shaped so as to interface with a cheater handle when the removable plug is removed from the third port.

9. The valve assembly of claim 1, where the internal seal comprises an O-ring seal.

10. The valve assembly of claim 1, where the internal seal comprises a valve packing.

11. The valve assembly of claim 1, where the internal seal comprises a valve packing of a mechanically-actuated valve.

12. The valve assembly of claim 1, where the second cavity is defined by a bonnet component sealed to the valve body, the second cavity enclosing the ferromagnetic portion of the internal actuation member.

13. The valve assembly of claim 1, further comprising a cheater handle, the cheater handle comprising:
   a mechanical lever comprising an interfacing portion sized and shaped so as to interface with the second end of the internal mechanism.

14. The valve assembly of claim 1, wherein the internal actuation member comprises an elongate member having a first internal actuation member end aligned with the first magnetic pole section and a second internal actuation member end aligned with the second magnetic pole section.

15. The valve assembly of claim 1, wherein the internal mechanism comprises a worm gear and corresponding worm.

16. The valve assembly of claim 1, wherein the internal mechanism comprises a traveling nut mechanism.

17. The valve assembly of claim 1, wherein the internal mechanism comprises a lead screw.

18. The valve assembly of claim 1, wherein the external actuator is not mechanically coupled to the internal actuation member or the internal mechanism.

19. A method, comprising:
   coupling a cheater handle to a mechanical linkage of a valve assembly, the valve assembly comprising:
      a valve body defining a first cavity and a second cavity, the valve body comprising a first port into the first cavity, a second port into the first cavity, and a third port into the second cavity;
      a movable valve member positioned in the first cavity between the first port and the second port and configured to control fluid flow from the first port to the second port;
      an internal seal disposed in the valve body between the first cavity and the second cavity that prevents fluid flowing through the first port or the second port from reaching the second cavity;
      an internal mechanism with a first end and a second end, the first end disposed in the first cavity and operatively coupled to the movable valve member, the second end traversing the internal seal and positioned in the second cavity;
      a removable plug operable to seal off the third port and the second end of the internal mechanism from an external environment of the valve assembly when the removable plug is seated in the third port;
      an internal actuation member having a ferromagnetic portion comprising an impermanent or permanent magnet, the internal actuation member operatively coupled to at least a portion of the internal mechanism; and
      an external actuator operatively coupled to an exterior of the valve body, the external actuator comprising:
         a first magnetic pole section adjacent to the valve body; and
         a second magnetic pole section adjacent to the valve body;
      wherein movement of the external actuator is effective to exert a first force on the internal mechanism, and wherein the internal mechanism is effective to transmit a second force to the movable valve member; and wherein coupling the cheater handle to the mechanical linkage of the valve assembly comprises:
   removing the removable plug from the third port; and
   coupling the cheater handle to the second end of the internal mechanism.

* * * * *